US011887572B2

(12) United States Patent
Czech et al.

(10) Patent No.: US 11,887,572 B2
(45) Date of Patent: *Jan. 30, 2024

(54) MODULAR FIXTURE WITH INTEGRATED ACOUSTIC SOUND ABSORBING HOUSING

(71) Applicant: Focal Point, LLC, Chicago, IL (US)

(72) Inventors: Ken Czech, Naperville, IL (US); Matthew Robert Blakeley, Naperville, IL (US); Krutin S. Desai, Chicago, IL (US)

(73) Assignee: Focal Point, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,519

(22) Filed: Jun. 30, 2022

(65) Prior Publication Data

US 2022/0335919 A1 Oct. 20, 2022

Related U.S. Application Data

(60) Continuation of application No. 17/515,708, filed on Nov. 1, 2021, now Pat. No. 11,380,296, which is a (Continued)

(51) Int. Cl.
*G10K 11/162* (2006.01)
*G10K 11/00* (2006.01)
(Continued)

(52) U.S. Cl.
CPC .......... *G10K 11/162* (2013.01); *F21V 23/003* (2013.01); *F21V 33/00* (2013.01); *G10K 11/002* (2013.01); *G10K 11/16* (2013.01); *F21V 3/04* (2013.01); *F21Y 2103/10* (2016.08); *F21Y 2115/10* (2016.08)

(58) Field of Classification Search
CPC . F21S 8/04; F21S 8/06; G10K 11/002; G10K 11/17861
See application file for complete search history.

(56) References Cited

U.S. PATENT DOCUMENTS 2,715,449 A 8/1955 Lemmerman et al.
2,759,093 A 8/1956 Ferar et al.
(Continued)

FOREIGN PATENT DOCUMENTS

DE 202011104144 U1 * 1/2012 ................ F21S 2/00
WO 2016/041023 A1 3/2016

OTHER PUBLICATIONS

Acoshape+ Technical Data Sheet—Modell Barcode Acoustic.
(Continued)

*Primary Examiner* — William N Harris
(74) *Attorney, Agent, or Firm* — Greenberg Traurig, LLP

(57) ABSTRACT

A modular fixture includes a plurality of acoustic panels and at least one support structure, where the acoustic panels have at least one cut-out that is configured to partially receive a portion of the at least one support structure, which is inserted into the at least one cut-out. The plurality of acoustic panels engage the at least one support structure and are supported by it. The at least one cut-out can be of a variety of shapes, including dovetail, rectangular and cylindrical, and the each of the plurality of acoustic panels may be of differing shape profiles.

30 Claims, 40 Drawing Sheets

Related U.S. Application Data division of application No. 15/973,054, filed on May 7, 2018, now Pat. No. 11,211,040.

(60) Provisional application No. 62/559,343, filed on Sep. 15, 2017.

(51) Int. Cl.

| | |
|---|---|
| ***G10K 11/16*** | (2006.01) |
| ***F21V 23/00*** | (2015.01) |
| ***F21V 33/00*** | (2006.01) |
| ***F21Y 103/10*** | (2016.01) |
| ***F21Y 115/10*** | (2016.01) |
| ***F21V 3/04*** | (2018.01) |

(56) References Cited

U.S. PATENT DOCUMENTS

| | | | | |
|---|---|---|---|---|
| 3,353,016 | A | 11/1967 | Robinson | |
| 5,782,551 | A | 7/1998 | Capaul | |
| 6,367,581 | B1 | 4/2002 | Marler et al. | |
| 7,686,482 | B2 | 3/2010 | Gendreisch et al. | |
| 8,967,823 | B2 | 3/2015 | D'Antonio | |
| 9,038,344 | B2 | 5/2015 | Mayer | |
| 9,147,390 | B2 | 9/2015 | Swinkels et al. | |
| 9,792,891 | B2 | 10/2017 | Swinkels et al. | |
| 10,359,163 | B1 | 7/2019 | Hettwer et al. | |
| 10,598,355 | B2 | 3/2020 | Ross et al. | |
| 10,672,376 | B1 | 6/2020 | Pickens et al. | |
| 2016/0123005 | A1 | 5/2016 | Booij et al. | |
| 2016/0178146 | A1 * | 6/2016 | Oleske | E04B 9/006 52/28 |
| 2016/0186942 | A1 | 6/2016 | De Gier | |
| 2016/0369972 | A1 | 12/2016 | Thijssen et al. | |
| 2016/0372100 | A1 * | 12/2016 | Mason | G10K 11/172 |
| 2017/0159928 | A1 | 6/2017 | Gommans et al. | |
| 2018/0334804 | A1 | 11/2018 | Patterson | |
| 2018/0336875 | A1 | 11/2018 | Patterson et al. | |
| 2019/0017260 | A1 * | 1/2019 | Bou Harb | E04B 9/001 |
| 2020/0011056 | A1 | 1/2020 | Patterson | |

OTHER PUBLICATIONS

Acoshape+ Technical Data Sheet—Modell Barcode Down.
Acoshape+ Technical Data Sheet—Modell Barcode Down / Up.
Acoshape+ Technical Data Sheet—Modell Morse 3.
Acoshape+ Technical Data Sheet—Modell Morse 4.
Matric Baffel—PS / PK.
Lightnet—Ringo Star—G6 Acoustic, Article Code: RG6OWE-827M-D1200-AFW-KW—Jun. 6, 2017.
Lightnet—Ringo Star—G6 Acoustic, Article Code: RG6OWE-840M-D1200-AFW-KW—Jun. 6, 2017.
Lightnet—Ringo Star—G6 Acoustic, Article Code: RG6OWL-840M-D1980-AFW-KW—Jun. 6, 2017.
Lightnet—Ringo Star Acoustic—P6 / G6.
Article—Sound Absorbing Lamp Calms Busy Spaces [Future of Home Living]—PSFK.com—Jun. 28, 2013.
Andlight—Slab 150—Lukas eet / 2013—Pendant Cutsheet.
LightArt—Static—Data Sheet—www.lightart.com/product/static.
Spectral Acoustic range—Blade Light and Acoustic Baffles—Catalog—Jun. 2017.
Diade Monica Armani Brochure—2017.
Article—designboom.com/technology/philips-onespace-luminars-ceiling-lighting-04/01/2014—philips re-invents ceiling lighting with a sound absorbing LED panel.
Turf Slab Data Sheet 2016.
YLighting—Exclusive Slab 150 W20 LED Wall Sconce.

* cited by examiner

FIG. 18
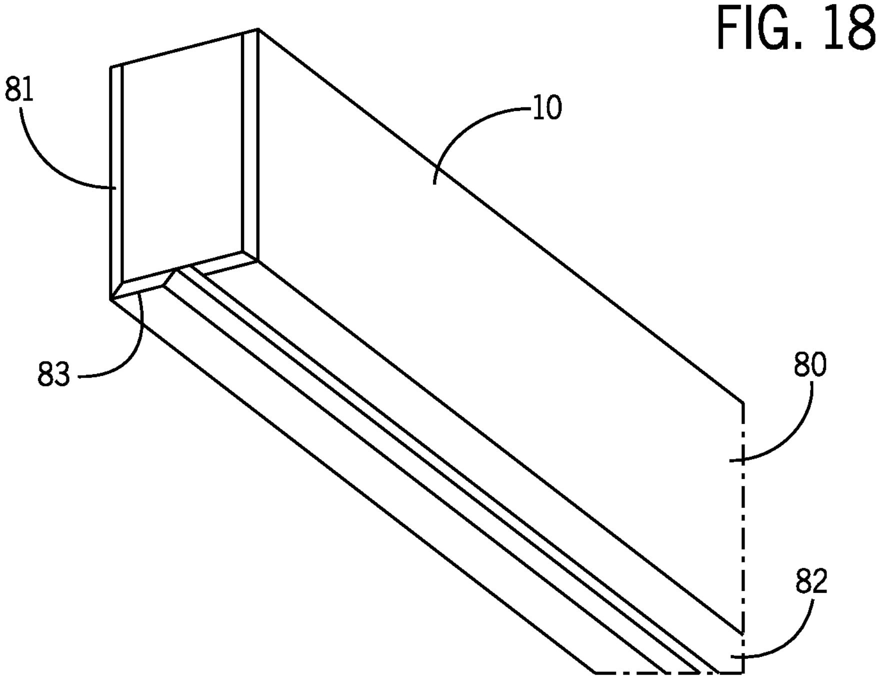
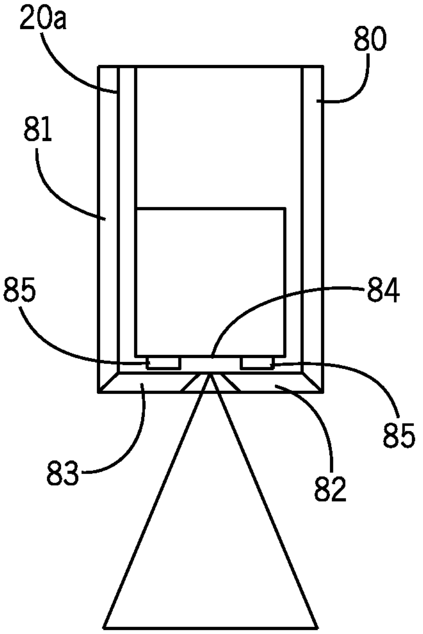
FIG. 19

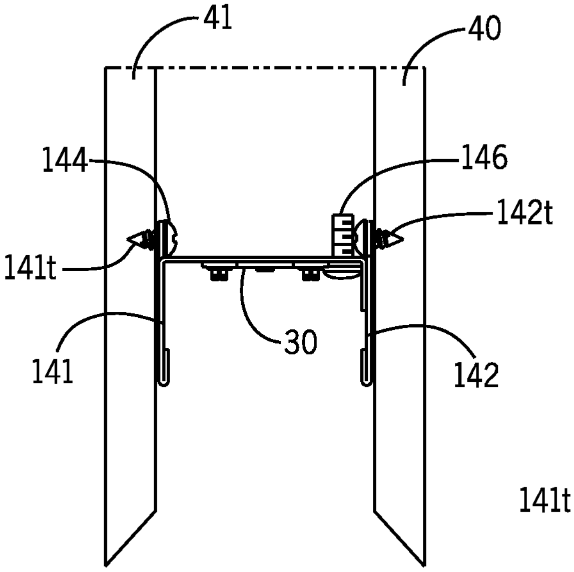
FIG. 34
FIG. 35B
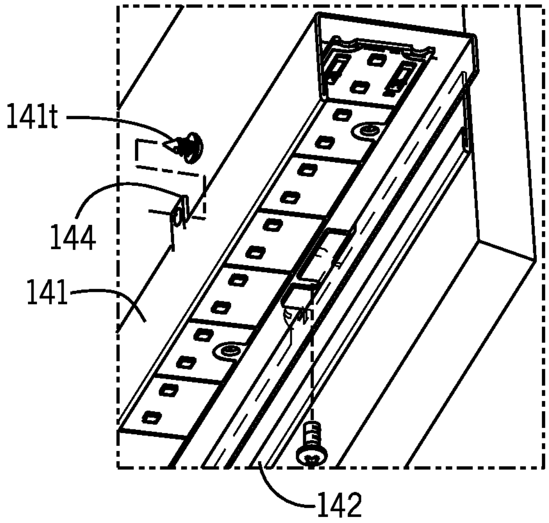
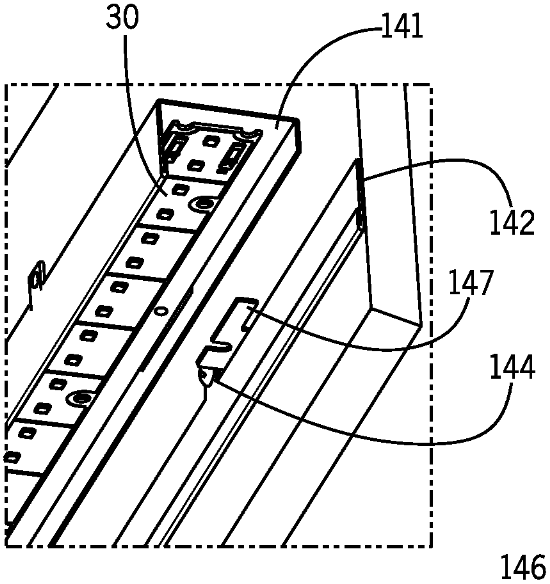
FIG. 35A
FIG. 35C
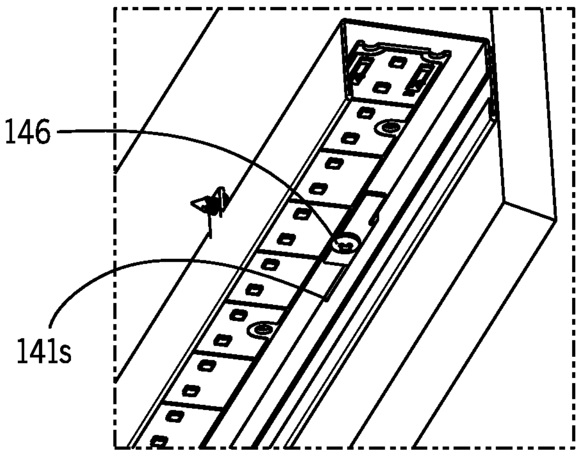

MODULAR FIXTURE WITH INTEGRATED ACOUSTIC SOUND ABSORBING HOUSING

RELATED APPLICATION DATA

This application is a continuation application of U.S. patent application Ser. No. 17/515,708, filed on Nov. 1, 2021, which claims the benefit of and is a divisional of U.S. patent application Ser. No. 15/973,054, filed on May 7, 2018, which claims the benefit of and is a continuation of U.S. 62/559,343, filed on Sep. 15, 2017, the disclosures of all of which are both incorporated herein by reference in their entireties.

FIELD OF THE DISCLOSURE

The present description relates generally to the construction of fixtures such as lighting fixtures, in particular, the construction of an LED based lighting fixture having acoustic sound absorbing panels forming at least part of the housing of the lighting fixture, and in particular, to such a lighting fixture in which the acoustic sound absorbing side panels are mechanically and releasably affixed to an internal support structure by modular components. Principles of the present invention may further be adapted to providing acoustic sound absorbing panels that do not include any source of lighting.

BRIEF DESCRIPTION OF THE DRAWINGS

FIGS. 16 and 17 are perspective views of the modular acoustic panels of the present invention illustrating the grooves formed therein for cooperation with corresponding support rails formed in the linear support structure, in which FIG. 17 shows the panel of FIG. 16 in an articulated orientation.

FIGS. 18 and 19 are perspective and front elevated views, respectively, of an example of the present invention in which a portion of each acoustic panel wraps around the bottom of support structure 20, to enclose a portion of the lower facing surface of the lighting fixture, to form a narrow aperture instead of the removable LED lens.

FIG. 34 is an elevated front view of a portion of the interior of an example of the present invention, in which the end caps are not shown.

FIGS. 35A—C are perspective views of a portion of the lighting fixture shown in FIG. 34.

DETAILED DESCRIPTION

The following description of the invention herein is not intended to limit the scope of the description to the precise form or forms detailed herein. Instead the following description is intended to be illustrative so that others may follow its teachings.

While the invention as disclosed and described herein is in the form of a linear LED lighting fixture designed to be suspended from a ceiling or other support structure, it should be appreciated that the inventive concepts disclosed herein can be utilized in other types of lighting fixtures, in other various shapes and orientations, and for other intended applications. For example, one or more novel aspects of the invention disclosed herein may be adapted and applied to sound absorbing acoustic panels that do not include a lighting element and wherein the modular aspect of the present invention may be integrated into a system comprising a plurality of aesthetically identical acoustic panels, some of which include lighting elements and some of which do not.

Figure 1:
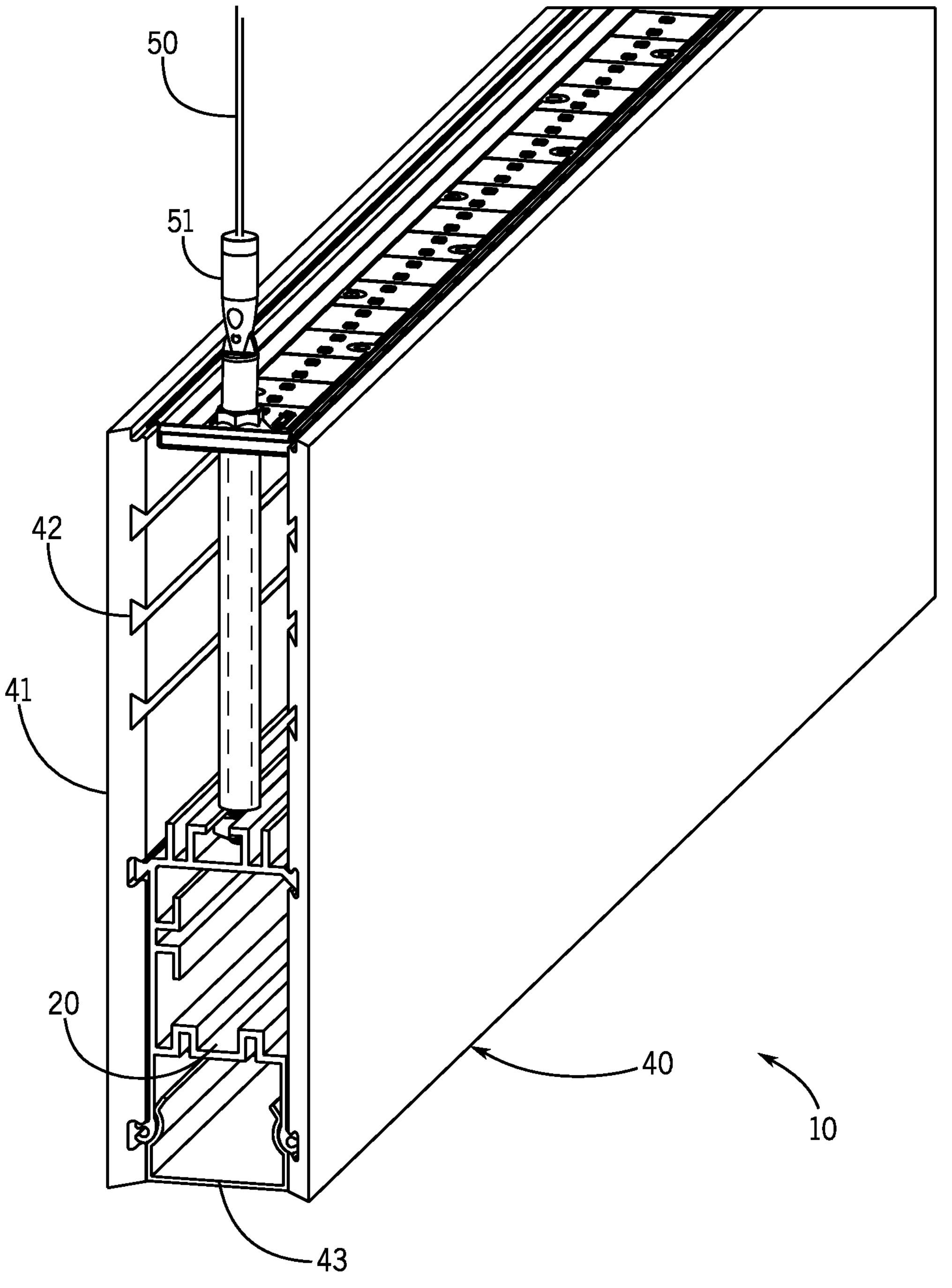
FIG. 1 is a perspective view of a lighting fixture according to the present invention in which the end caps are not shown.

FIG. 1 of the drawings discloses linear LED-based lighting fixture 10. As shown, lighting fixture 10 includes modular acoustic side panels 40 and 41 which are affixed to linear support structure, or spine, 20 that runs the length of the fixture. In this embodiment, linear support structure 20 is preferably constructed from an aluminum extrusion having an asymmetrical design that allows for the attachment of the various components of the lighting fixture, which includes an LED light board and an LED driver, as further described herein. Linear support structure 20 can be constructed of other materials and, depending upon the overall fixture design, may not necessarily extend the entire length of the fixture. While the lighting elements incorporated into the illustrated embodiments incorporate LED's, other light producing elements, such as incandescent, fluorescent, halogen or neon lighting sources may be used, either alone or in combination with LED's.

Figure 51:
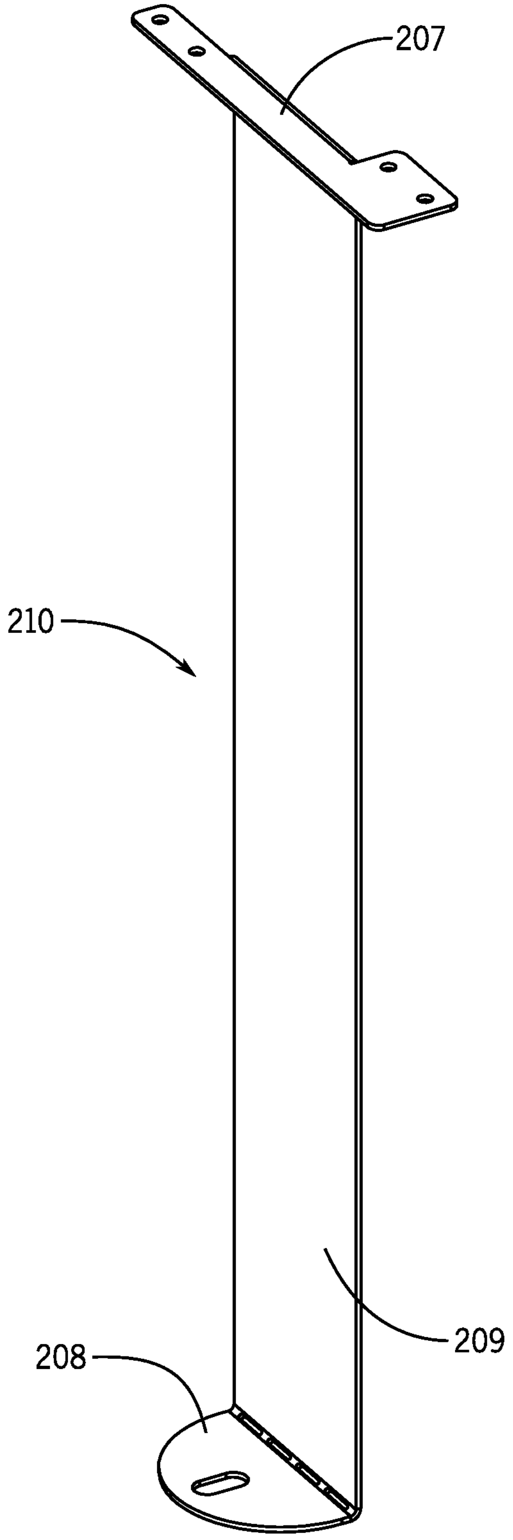
FIG. 51 is a perspective view of an internal panel support for an unlit acoustic panel or baffles according to FIGS. 48 and 50.
Figure 52:
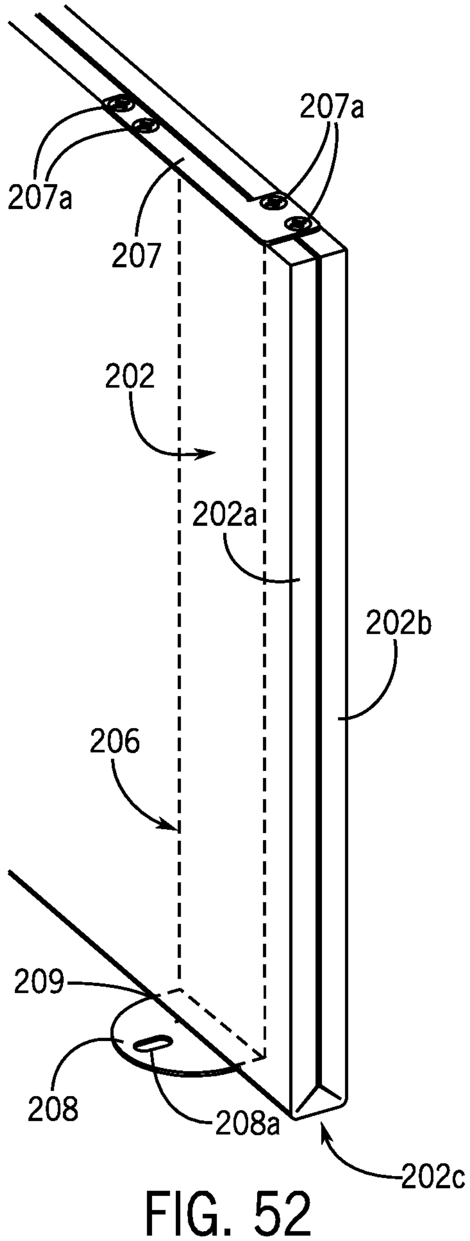
FIG. 52 is a perspective view of an example of an unlit acoustic panel or baffle including an internal panel support for use in the embodiments of FIGS. 48 and 50.

In one embodiment, acoustic side panels 40 and 41 are fabricated from at least partially recycled PET (polyethylene terephthalate) panels that possess inherent acoustic dampening properties that serve to interfere with the propagation of sound waves, to enable the present lighting fixture to serve as a source of light and as a noise reduction device in the environment in which the lighting fixture is utilized. These modular side panels are semi-rigid in composition and thus enhance the structural integrity of the light fixture housing. The acoustic side panels also provide flexibility enabling changes to the fixture's color or texture—without painting, simply by exchanging panels. The acoustic side panels are typically 6 mm to 12 mm thick and have an average noise reduction coefficient (NRC) of 0.55 to 1.0. Alternatively, acoustic side panels 40 and 41 may be fabricated from other materials having requisite sound absorbing characteristics, such as for example, organic material including wool, moss, wood etc.; and/or inorganic material including polyester, foam, cellulose, etc. While acoustic side panels 40 and 41 are illustrated as having a single layer, a two or more ply construction may also be utilized. Moreover, a multi-ply construction of acoustic side panel may include one or more internal supports, fabricated of metal or other suitably rigid material, which may be configured, in part, based upon the overall length of fixture 10, as shown in FIGS. 51 and 52.

In this embodiment, rather than merely being affixed to the exterior solid surface of a conventional linear lighting fixture, for example by adhesive or other non-removable means, acoustic side panels 40 and 41 are especially configured to form a structural element of fixture 10 and to physically, and removably, attach to linear support structure 20, as further described in connection with FIGS. 2, 3 and 4. It will be appreciated that the spatial void within fixture 10, between the opposing acoustic side panels 40 and 41, serves to further absorb sound waves and diminish the reflection of same.

Figure 2:
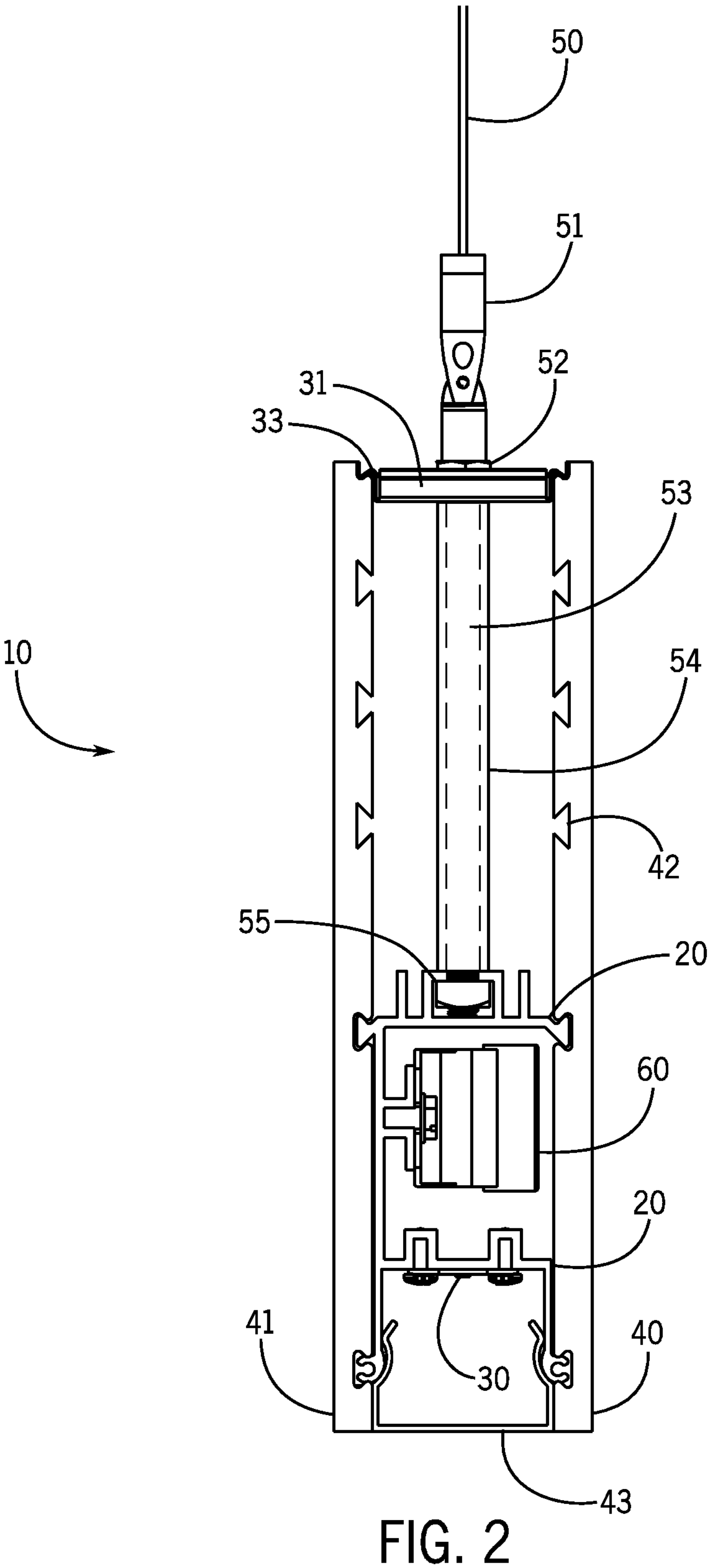
FIG. 2 is an elevated front view of the interior of the lighting fixture according to the present invention, in which the end caps are not shown.
Figure 11:
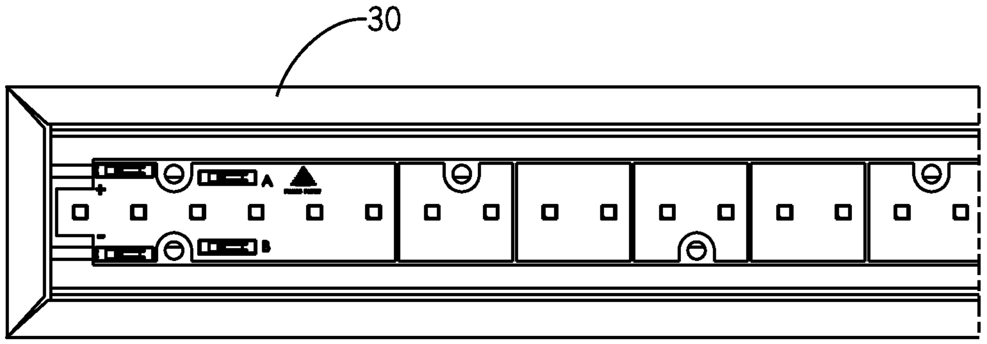
FIG. 11 is a bottom plan view of the lower LED board and FIG. 12 a top plan view of the upper LED board for the present invention.

In the example illustrated herein in FIG. 1 and as further shown in FIG. 2, linear fixture 10 includes lower LED panel 30 (also shown in FIG. 11) secured to the bottom facing surface of linear support structure 20 and an optional upper LED light board 31 (also shown in FIG. 11). Lower LED panel 30 projects light downwardly while upper LED light board 31 projects light upwardly.

Acoustic side panels 40 and 41 are secured to linear support structure 20 and LED light board 31, via a tongue and groove mechanism as shown in greater detail in FIG. 2. In the example illustrated, light fixture 10 is configured to be suspended from a ceiling or other raised structure via cable 50 which is secured to a cable suspension gripper 51. Alternate mechanisms for positioning and/or suspending light fixture 10 are deemed to be within the scope of this invention. For example, light fixture 10 could be supported by a horizontal bracket secured to a column or wall.

Figure 21:
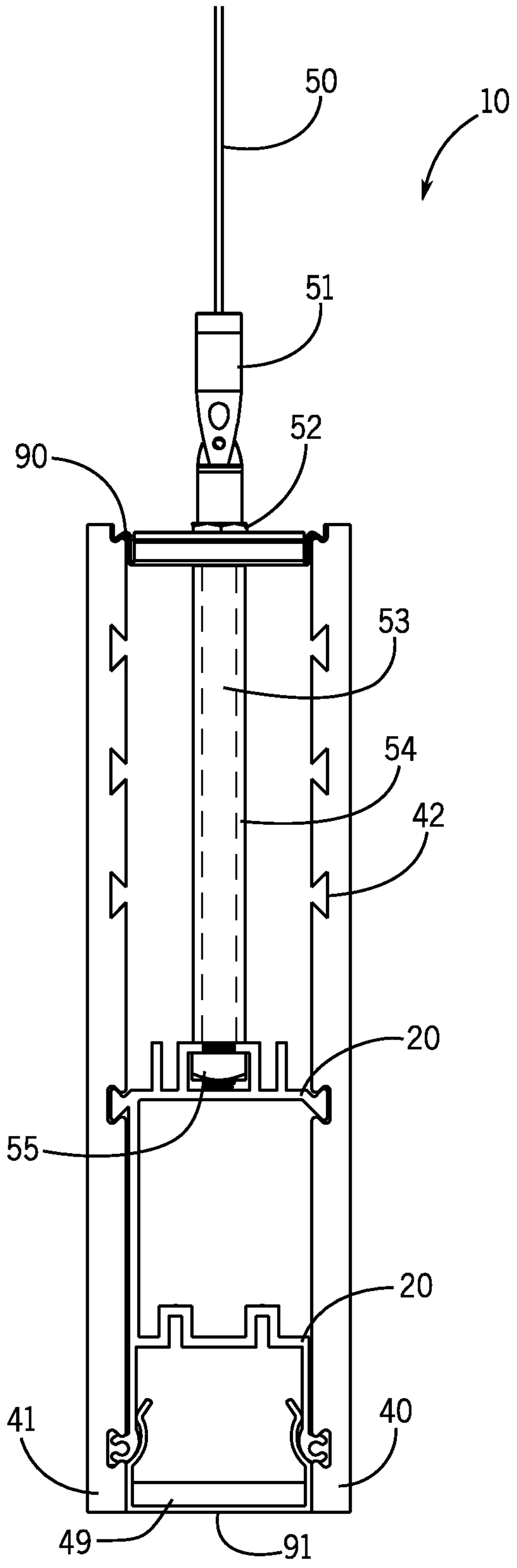
FIG. 21 is an elevated front view of the interior of an acoustic baffle fixture according to the present invention having no lighting elements, in which the end caps are not shown.

Visible light generated by lower LED board 30 projects downwardly from fixture 10, passing through lens 43 while visible light emanating from light board 31 projects upwardly from the top of the fixture. While the lower edge of lens 43 is illustrated aligned with the lower edge of adjacent acoustic panels 40 and 41, lens 43 may be configured to be recessed upward into fixture 10. In a preferred embodiment of the present invention, each such lens 43 is frosted to promote the diffusion of light produced by LED board 30. In alternative embodiments, lens 43 may be clear, frosted or painted, with fixtures 10 including one, the other or multiple style lenses. The color of painted versions of lens 43 may be the same as, or contrast, the color of the acoustic side panels 40 and/or 41. In certain unlit embodiments the lens may be lined with the acoustic material itself as shown in FIG. 21 where lens 91 is lined with acoustical material 49.

Figure 22:
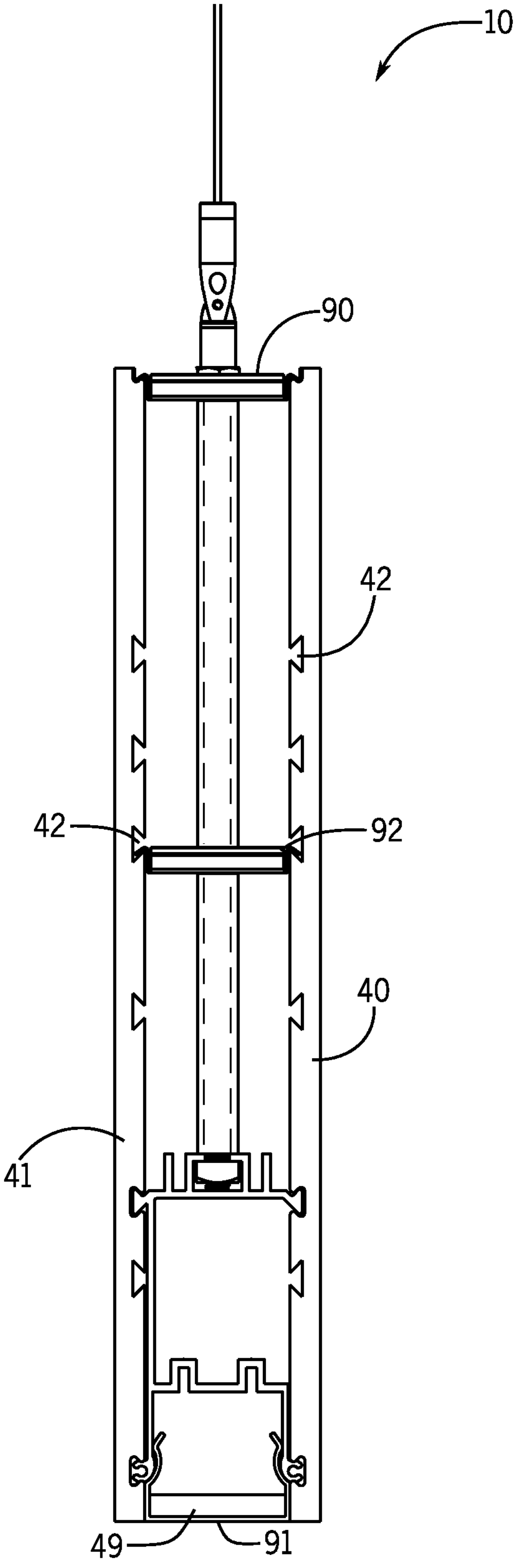
FIG. 22 is a front elevational view of the interior of an example of a non-lighted acoustic baffle fixture according to the present invention in which the end caps are not shown.

In the example illustrated in FIG. 2, lighting fixture 10 includes two LED light boards 30 and 31, respectively, facing downwardly and upwardly. LED light boards 30 and 31 include one or more LED light producing elements that are connected to an LED driver 60 via wires (not shown). LED driver 60 is, in turn, connected to a source of electric power by wires (not shown). As shown in FIGS. 21 and 22, the principles of the present invention may be adapted to a sound absorbing structure that includes a down-light an up-light, both or neither.

Fixture 10, as depicted, is suspended via cable 50, which could alternatively comprise a rigid support rod. Cable 50 is joined to fixture 10 via cable suspension gripper 51, which, in turn, is joined to threaded rod 53 and secured thereto by nut 52. The lower end of threaded rod 53 is affixed to the upper facing portion of linear support structure 20 via nut 55, or by a bolt end formed onto rod 53. Also, in the example illustrated, threaded rod 53 is surrounded by rigid tube 54. The assembly of support structure 20, rod 53, tube 54 and LED light board 31 are tensioned and locked together by nuts 52 and 55, and serve, in part, to suspend and secure upper LED light board 31. Alternative vertical support structure(s) may be used in place of threaded rod 53.

Figure 3:
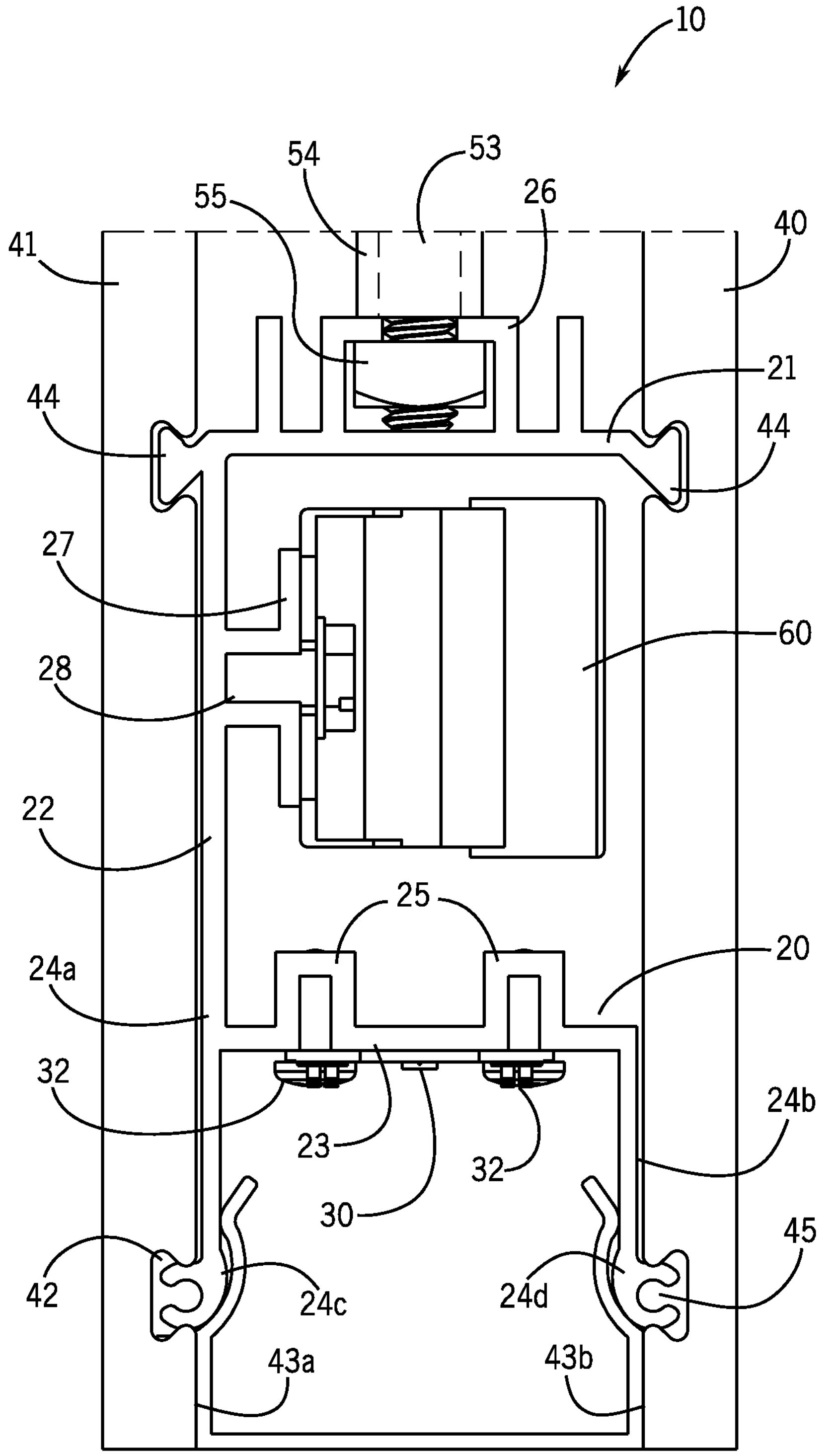
FIG. 3 is an enlarged view of a portion of the interior of the lighting fixture shown in FIG. 2, in which the end caps are not shown, illustrating the linear support structure that supports the acoustic side panels.

FIG. 3 illustrates in greater detail the manner in which acoustic side panels 40 and 41 are secured to linear support structure 20 to form a complete fixture housing. As illustrated in that example, linear support structure 20 comprises an asymmetrical U-shaped structure which is preferably fabricated from extruded aluminum. As discussed, linear support structure 20 provides the structure to which the various components of the light fixture can be mounted, including the acoustic panels. While one asymmetrical configuration is disclosed, other configurations are envisioned as being within the scope of the invention wherein the structure could be re-configured or otherwise adapted for various components or, indeed, different shaped fixtures. It will be appreciated that, in this example the use of support structure 20, in cooperation with acoustic side panels, replaces the otherwise standard continuous metal housings that form a typical linear LED fixture. The relatively small size of support structure 20, in comparison to the size of the overall fixture, requires much less material and saves significant cost and weight—while still imparting modularity to the removal and replacement of specific acoustic panels.

Support structure 20 includes upper and lower horizontal members 21 and 23 that are joined by a single vertical member 22. Emanating downwardly from lower member 23 are lower side members **24*a* and 24*b*. Support structure 20 further includes structure to which various components can be secured, including upper channel 26 configured to receive retaining nut 55 and threaded rod 53. As illustrated, the top opening of channel 26 is dimensioned to receive threaded rod 53 surrounded by tube 54. Side panel 22 includes channel 27 which is configured to accept fastener 28, such as a flanged screw, that secures LED driver 60 to linear support structure 20. Lower LED board 30 is shown affixed to lower horizontal member 23 by fasteners 32 which thread into channels 25 formed in support structure 20. LED board 30 is directly mounted to support structure 20 in a manner that optimizes thermal contact, in which support structure 20 serves as a heat sink to dissipate the heat generated by the LED's. Integrally formed into the opposite ends of upper member 21 are support rails 44 which, in the example illustrated, have a dovetail configuration. Support rails 44 cooperate with corresponding, aligned dovetail-shaped grooves 42 formed in the respective acoustic side panels 40 and 41, to retain the panels to the sides of support structure 20. Grooves 42** may be formed by cutting, routing or otherwise machining the modular acoustic side panels.

Lower side elements **24*a* and 24*b* are shown as optionally including screw channels 45 (in place of dovetail rails 44) which have the dual function of both providing an anchor point/rail that cooperates with a corresponding aligned groove 42 formed in the acoustic side panel, while serving to provide an attachment point for flexible acrylic lens 43. In this example, lens 43 is formed of an extruded acrylic material that engages with the screw channel lobes 45**.

While acoustic side panels 40 and 41 are shown as having a straight planar configuration, they could be configured to have alternative profiles and shapes that would cooperate with a support structure of alternative designs. For example, a curved or undulating acoustic side panel design could be provided which are designed to cooperate with a curved or undulating support structure of appropriate length, width, and with support rails located to accommodate same.

Figure 4:
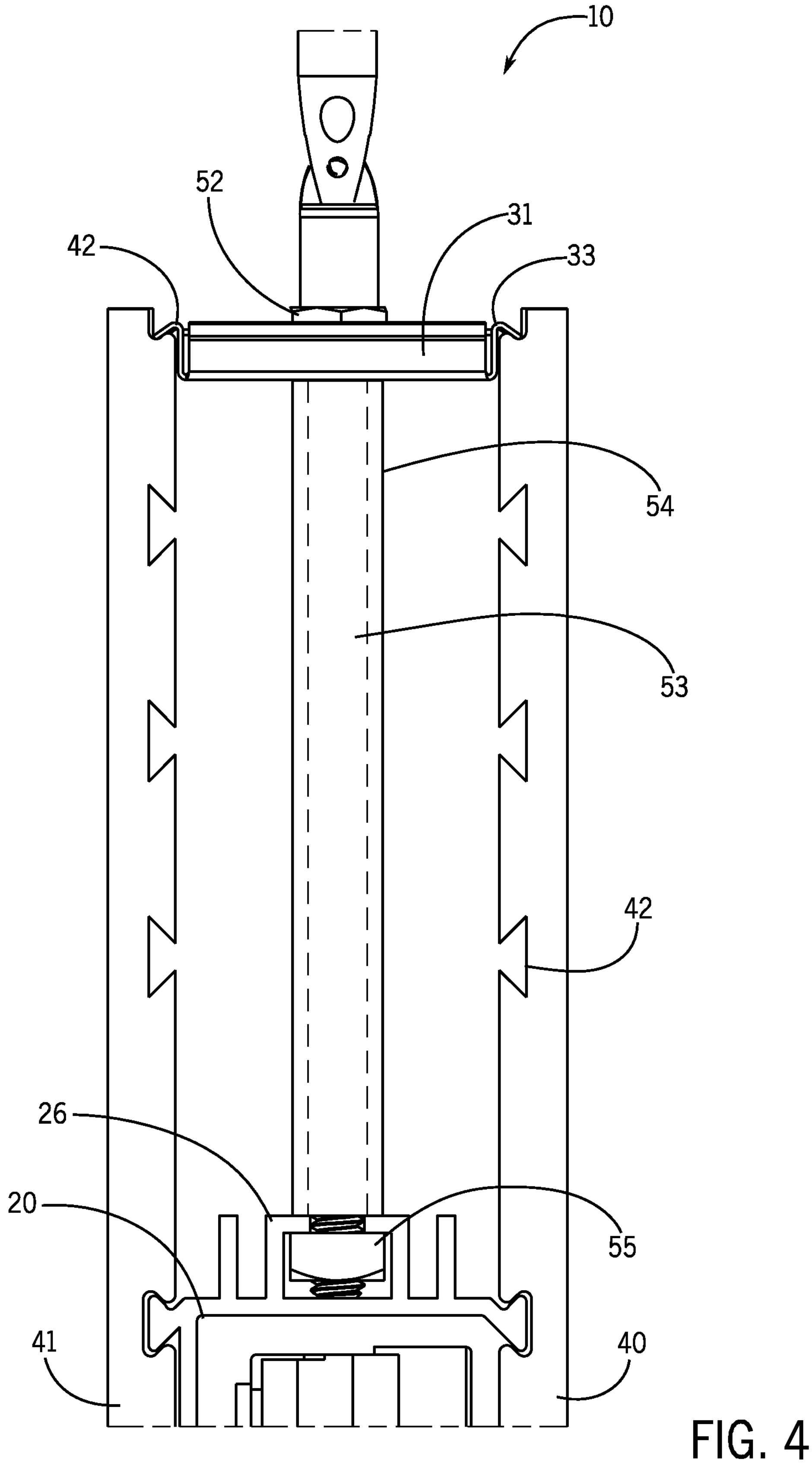
FIG. 4 is an enlarged view of another portion of the lighting fixture shown in FIG. 2, in which the end caps are not shown, highlighting the upper portion of the fixture.
Figure 5:
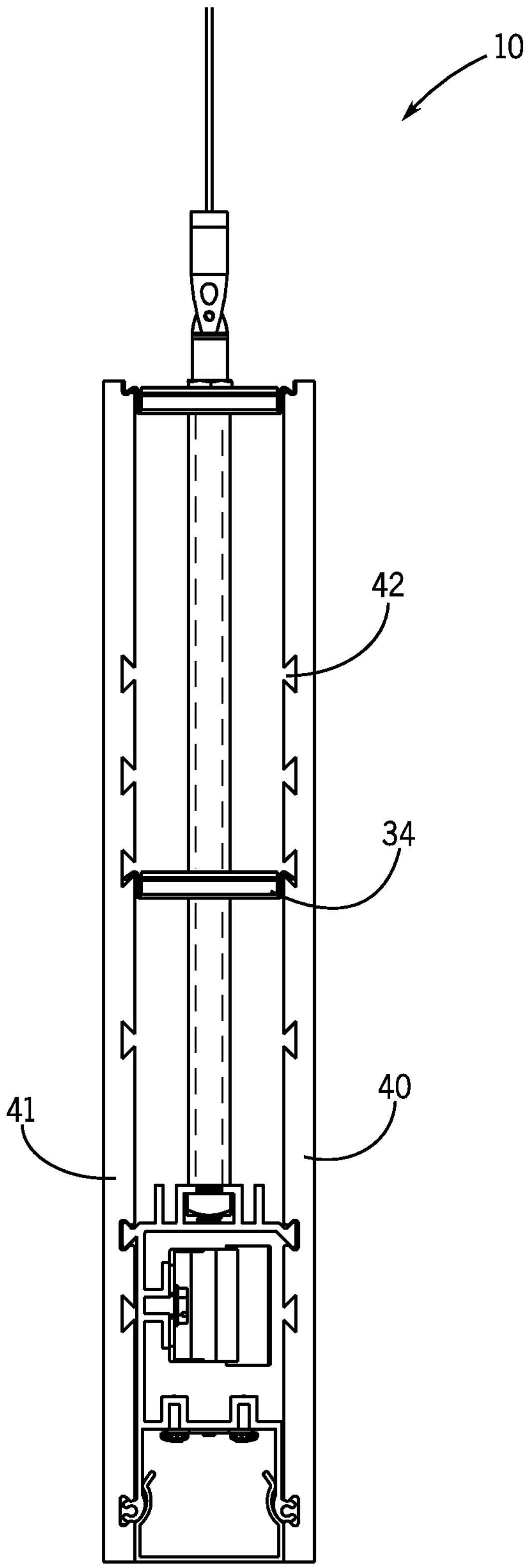
FIG. 5 is a front elevational view of the interior of an example of the lighting fixture according to the present invention in which the end caps are not shown.

FIG. 4 of the drawings illustrates the upper portion of fixture 10 and shows upper LED light board 31 secured to LED tray 33 which, in turn, cooperates with uppermost positioned groove 42, to create tension and structure to support the uppermost edges of acoustic side panels 40 and 41. It can be appreciated that the present design permits the construction of linear light fixtures of varying heights whereby reinforcement braces or brackets, such as brace 34 shown in FIG. 5, may additionally be positioned between the two LED light boards and secured to corresponding grooves, thereby joining the opposing acoustic side panels. Fixtures ranging in height from 8 inches up to 24 inches, or taller, are contemplated and may be constructed using one or more internal braces 34 whereby the added internal space results in a fixture having enhanced sound absorption properties.

While the present invention discloses the use of an upper LED light board 31, it may be omitted and replaced with a solid or perforated cover to provide structure, venting and support, as needed, together with an acoustic, sound-absorbing element.

Figure 6:
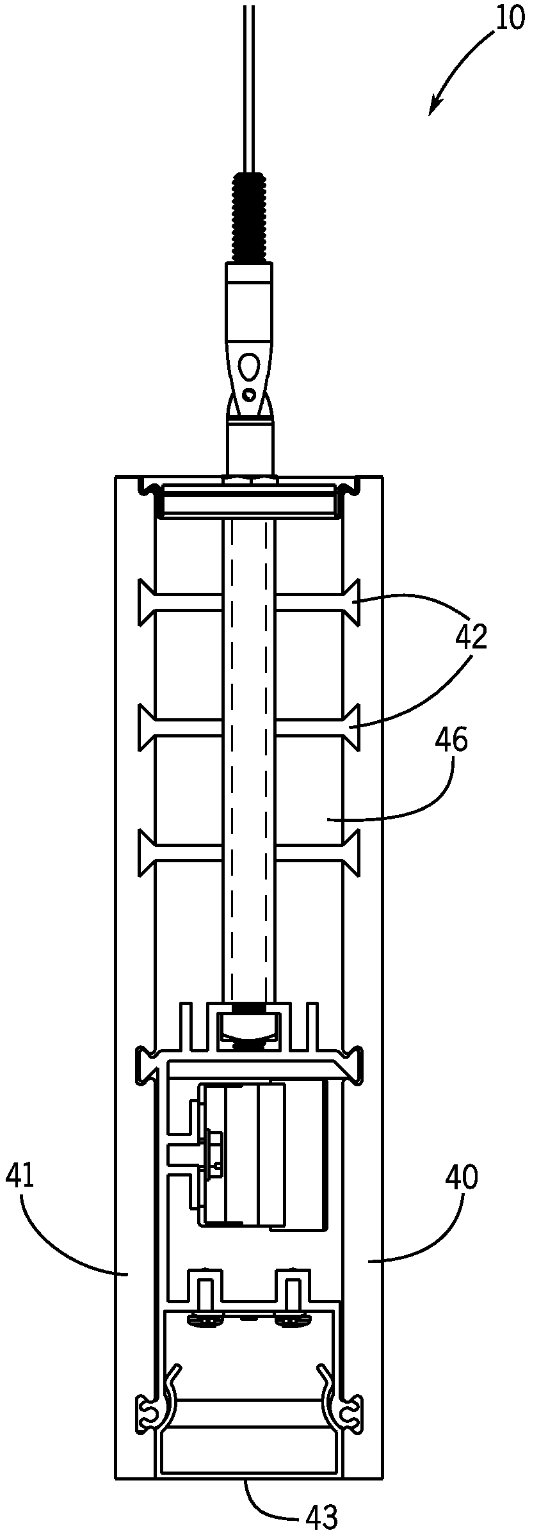
FIG. 6 is a front elevational view of the interior of another example of the lighting fixture according to the present invention, in which the rear most end cap is shown.
Figure 16:
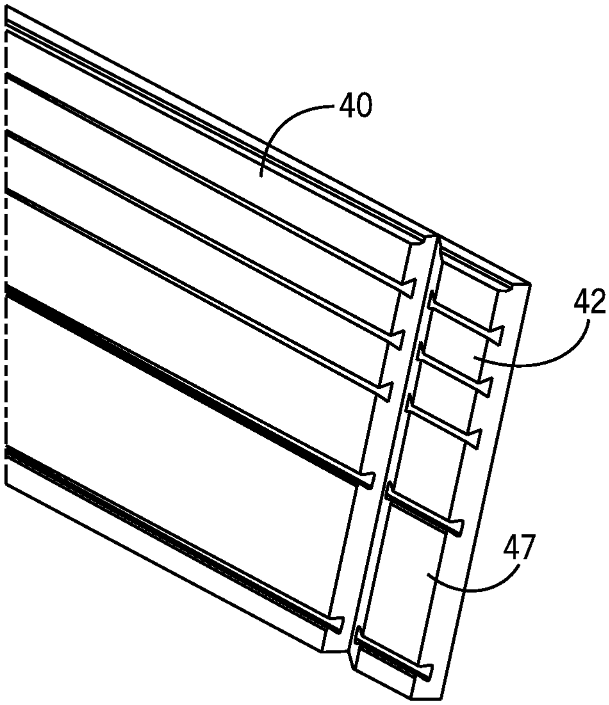
Figure 17:
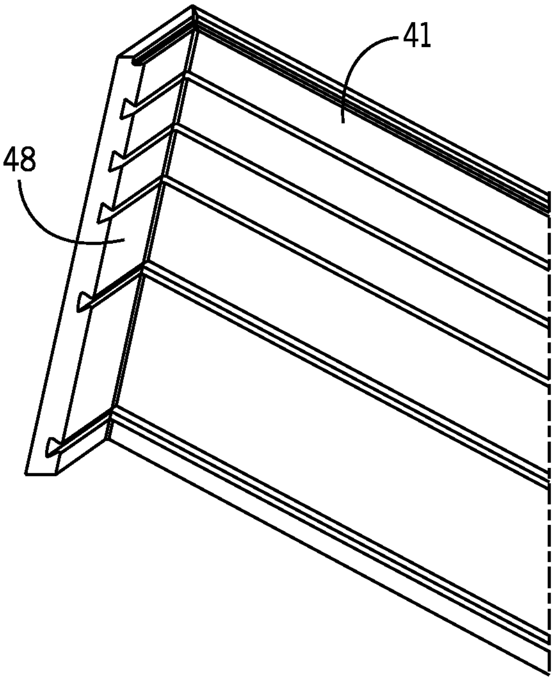

FIG. 6 of the drawings is a side elevational view illustrating partially assembled fixture 10 wherein end cap 46 is shown. Preferably, the end caps for the fixture 10 are fabricated of the same acoustic material as the acoustic side panels, and are configured by cutting and overlapping end segments of acoustic side panels 40 and 41, as further shown in FIGS. 16 and 17 such that end flaps 47 and 48 could be folded towards one another to close the otherwise open ends of fixture 10. Alternatively, the end caps can comprise separate panels that likewise snap into either the adjacent side panels, or the linear support structure.

Figure 7:
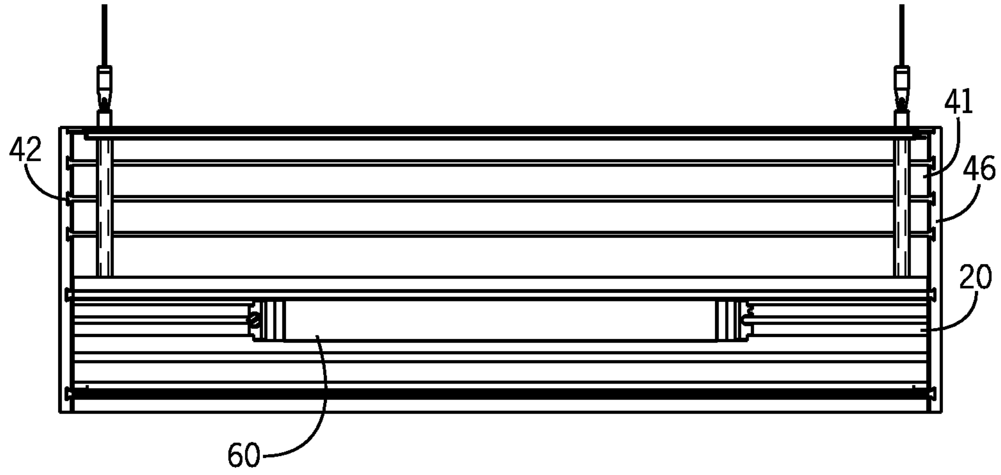
FIG. 7 is an elevated side view of the interior of the lighting fixture according to the present invention, with an acoustic panel removed, highlighting, in part, the linear support structure and LED driver.
Figure 8:
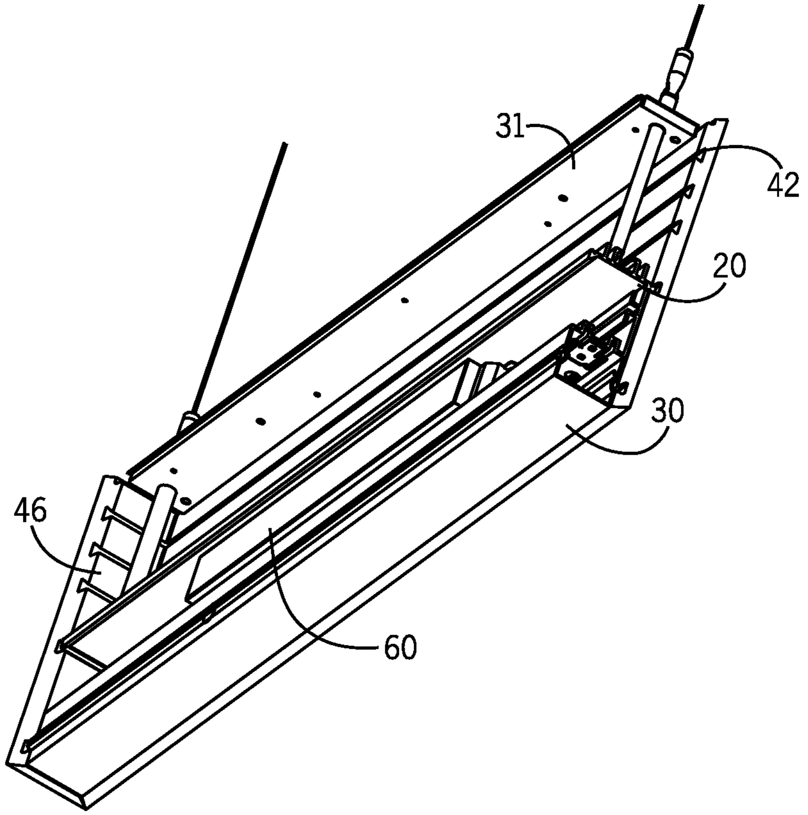
FIG. 8 is a perspective view of the lighting fixture as shown in FIG. 7, highlighting, in part, the linear support structure, lower LED board and LED driver.
Figure 9:
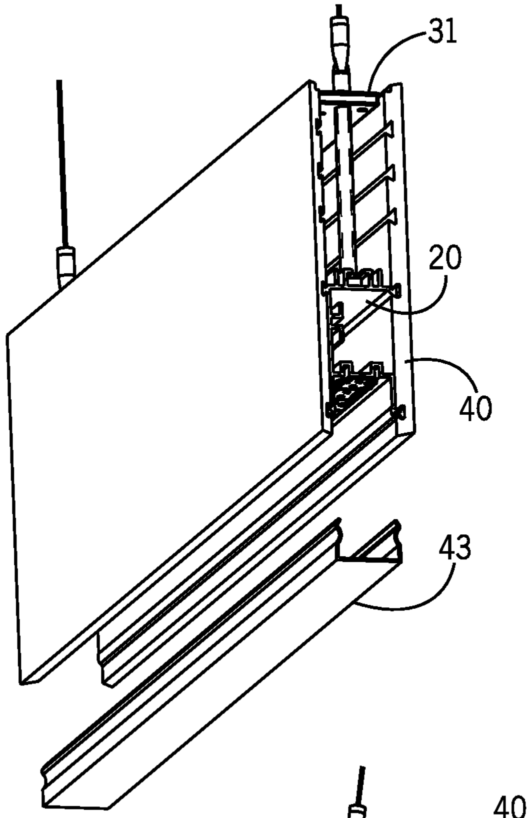
FIG. 9 is a perspective view of the lighting fixture as shown in FIG. 7, highlighting, in part, a removable LED lens.
Figure 10:
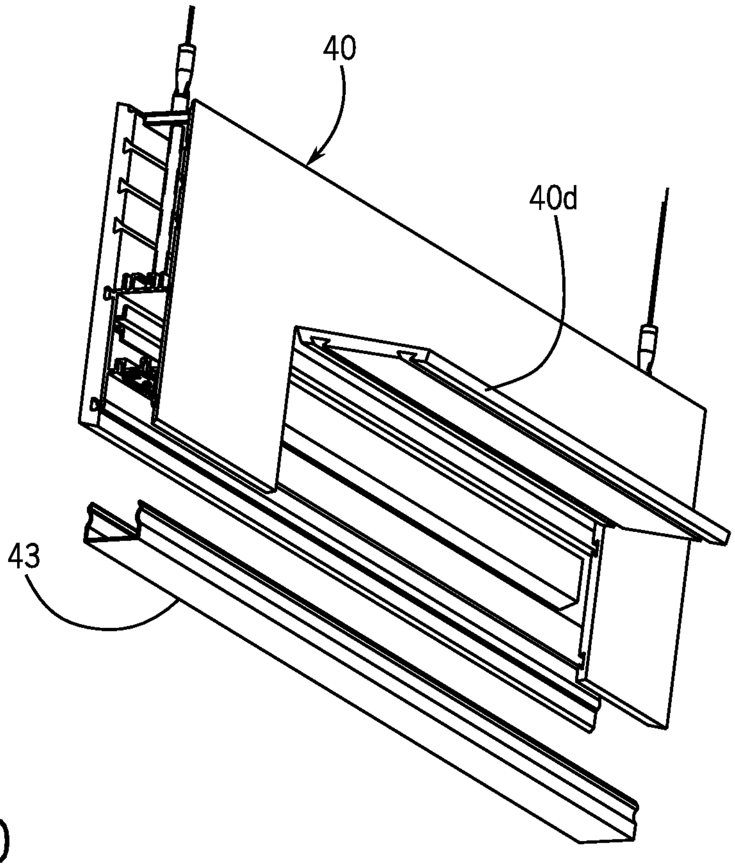
FIG. 10 is a perspective view of the lighting fixture as shown in FIG. 7, highlighting, in part, the removable LED lens and access door formed in a modular acoustic panel.

FIGS. 7 and 8 of the drawings illustrate additional aspects of the present fixture design, specifically side panel 41, the attachment of LED driver 60 to linear support structure 20 and the location of end panels 46. FIGS. 9 and 10 provide additional views of the present invention, with FIG. 10 particularly illustrating access door **40*d* created by cutting acoustic panel 40. Door 40*d* serves to provide access to the interior components of fixture 10, including LED driver 60** and wiring (not shown).

Figure 12:
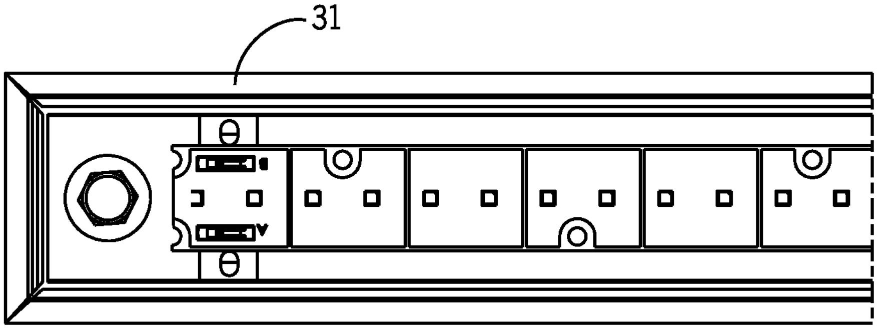
Figure 13:
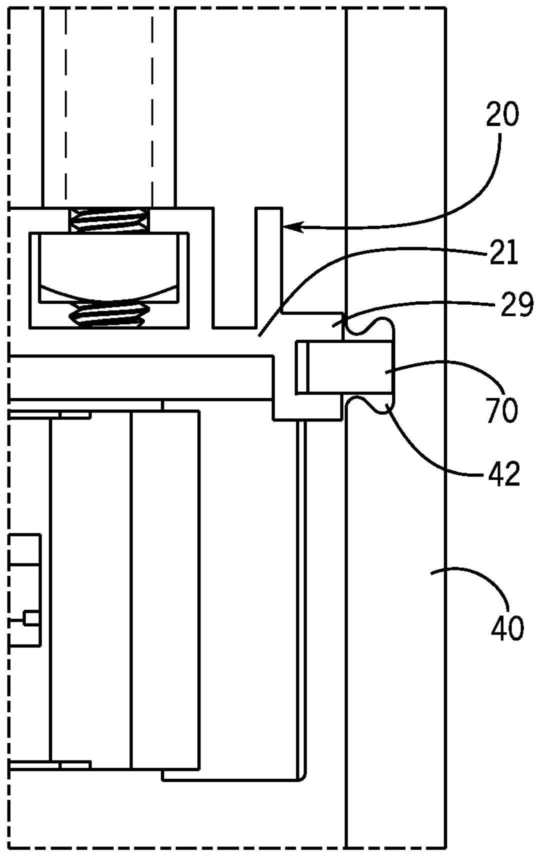
FIG. 13 is an elevated front view of a portion of the lighting fixture highlighting an alternative attachment element for securing the acoustic panel to the linear support structure.

FIGS. 11 and 12 illustrate lower and upper LED light boards 30 and 31 respectively. FIG. 13 of the drawings illustrates an alternative design for securing the acoustic side panel 40 to linear support structure 20. In the example illustrated, upper horizontal member 21 includes channel 29 facing outwardly, in alignment with the corresponding groove 42 formed in acoustic panel 41. Gasket 70 is affixed to the inner surface of groove 42 by adhesive or other means with gasket 70 dimensioned to securely, but removably, engage within channel 29. Alternative means for securing the acoustic side panels to the linear support structure, such as hook and loop fasteners or magnets, are also contemplated as being within the scope of the present invention.

Figure 14:
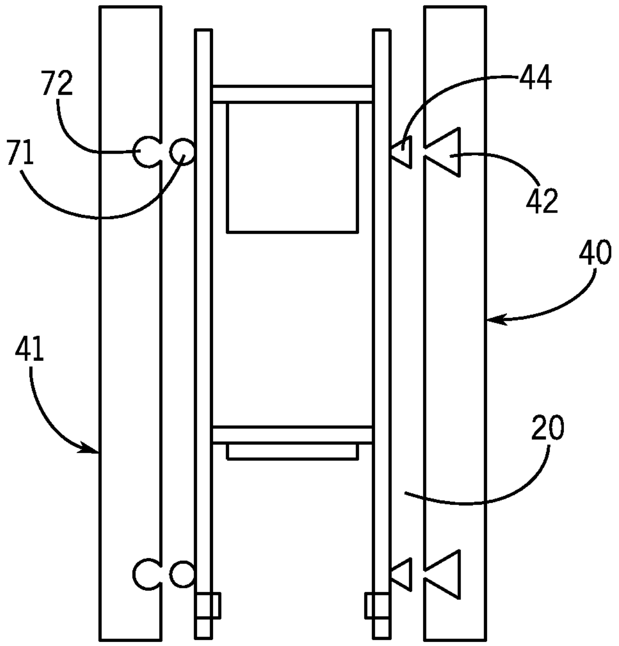
FIGS. 14 and 15 are elevated front schematics of alternative attachment elements for securing the acoustic panels to the linear support structure.

As illustrated further in FIG. 14, support rails 44 could instead have differently shaped profiles, such as a substantially circular profile 71, which cooperate with a substantially circular, cylindrical groove 72 formed in side panel 41, thereby providing for an interference "snap-fit" between side panel 41 and support structure 20. Depending upon the rigidity of the material forming acoustic side panels, the side panels may be slid lengthwise onto support rails 44, or alternatively snap fit directly onto rails 44/71.

Figure 15:
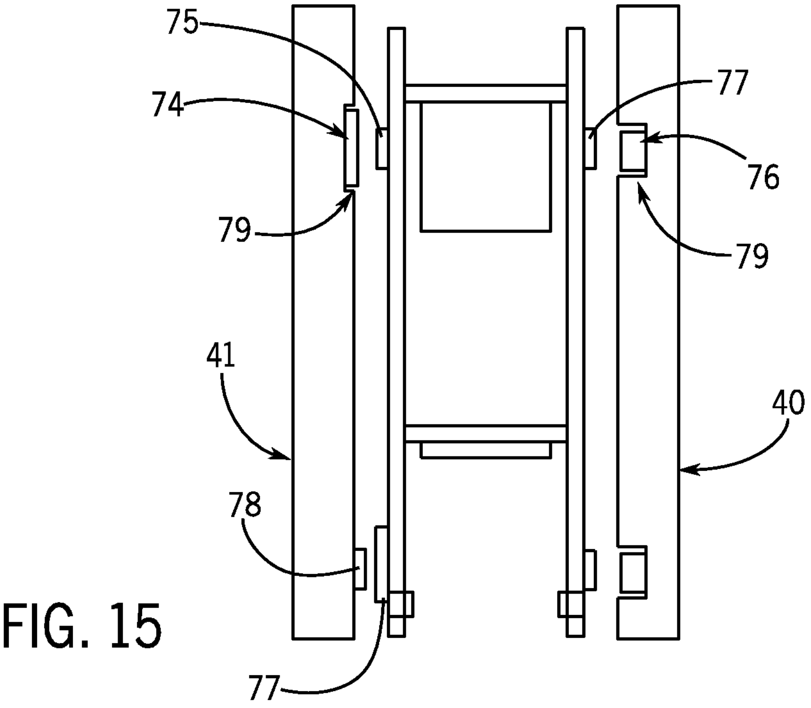

As illustrated in FIG. 15, side panels 40 and 41 may be releasably affixed to linear support structure 20 by other structural elements, such as hook and loop fasteners and/or magnets. In particular, side panel 40 may include channel 79 dimensioned to contain loop portion 76 of a hook and loop fastener (secured therein, for example, by adhesive) with the corresponding hook portion 77 affixed to spine structure 20, also by adhesive. Alternatively, side panel 41 may include channel or recess 79 dimensioned to contain ferrous element 74 (secured therein, for example, by adhesive) with magnet 75 secured to spine structure 20, also by adhesive. Channel 79 may also comprise a series of recesses (and aligned rails) spaced apart from one another along the inner facing surface of each of panels 40 and 41 (such as by routing), as opposed to a continuous channel formed along the entire length of the panel. Alternatively, magnet 78 would cooperate with corresponding ferrous element 77, which, in turn, may be secured directly to panel 41 using adhesive without the use of channels or recesses.

FIGS. 18 and 19 of the drawings illustrate yet another example of the present invention wherein a narrow opening is provided in the lower facing surface of fixture 10 by wrapping and/or securing mitered lower facing edges 82 and 83 of each acoustic side panel 80 and 81 respectively, inwardly towards one another which can be affixed to a portion of support structure **20*a* by adhesive pads 85, leaving a narrow aperture 84 through which the projected light can escape. Aperture 84** may alternatively be provided in fixtures which do not include lighting elements in order to provide a consistent appearance when combined with fixtures that do include lighting elements.

Figure 20:
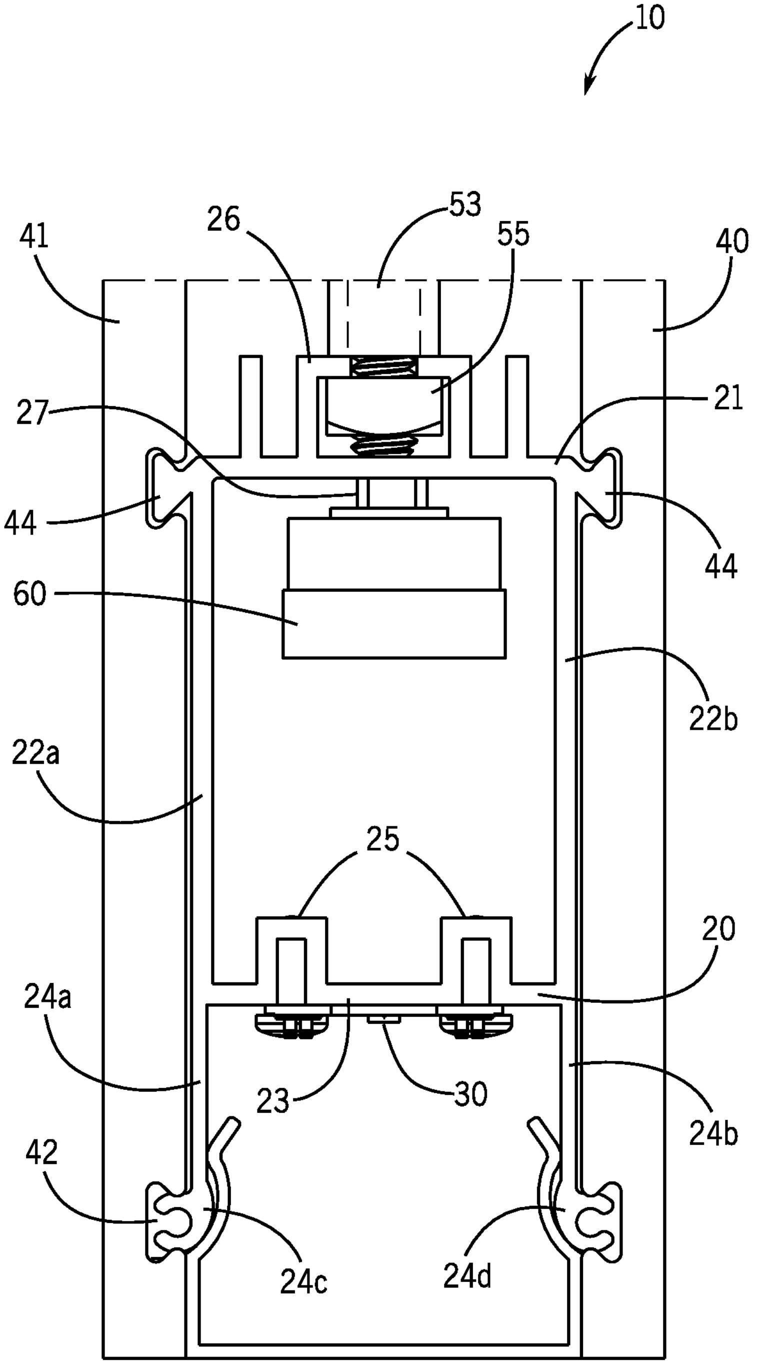
FIG. 20 of the drawings illustrates an enlarged view of the bottom portion of the interior of another example of the lighting fixture shown in FIG. 2, in which the end caps are not shown, illustrating the linear support structure having a substantially symmetrical configuration that supports the modular acoustic side panels.

FIG. 20 of the drawings illustrates an example of the present invention in which linear support structure 20 is constructed from an aluminum extrusion having a generally symmetrical design that allows for the attachment of the various components of the lighting fixture, including an LED light board and LED driver. As shown therein, linear support structure 20 includes upper and lower horizontal members 21 and 23 that are joined by two vertical members **22*a* and 22*b*. Emanating downwardly from lower member 23 are lower side members 24*a* and 24*b*. Upper horizontal member 21 includes upper channel 26 configured to receive retaining nut 55 and threaded rod 53. Upper horizontal member 21 includes channel 27 which is configured to accept a fastener, such as a flanged screw, that secures LED driver 60** to the structure.

FIG. 21 of the drawings illustrates an elevated front view of the interior of an example of the present invention omitting any internal lighting elements serving as an acoustic baffle fixture that could have the same visual appearance as a fixture that includes one or more lighting elements. As illustrated in FIG. 21, an LED light panel is completely omitted in which structural integrity is provided by brace 90 and support structure 20. Together with support structure 20, brace 90 serves to support and join panels 40 and 41 of fixture 10. Lens 91 is shown in position within the aperture formed at the bottom of the fixture. In one example, lens 91 may be frosted so as to have an appearance similar to a lit fixture 10 when the lit fixture is turned off.

Moreover, to provide an unlit fixture having a bottom facing surface similar in appearance to acoustic side panels 40 and 41, an assembly comprising clear lens 91 may be lined with insert 49 fabricated of the same material as acoustic side panels 40 and/or 41 positioned there behind lens 91, as shown in FIG. 21. This construction avoids the need for additional fasteners or structure to cap the bottom of the fixture with matching acoustic material.

FIG. 22 of the drawings illustrates an alternative to the example of the invention illustrated in FIG. 21 in which an intermediate brace 92 may additionally be positioned between brace 90 and lens 91, in which brace 92 is secured to corresponding grooves 42, thereby joining opposing acoustic side panels 40 and 41.

Figure 23:
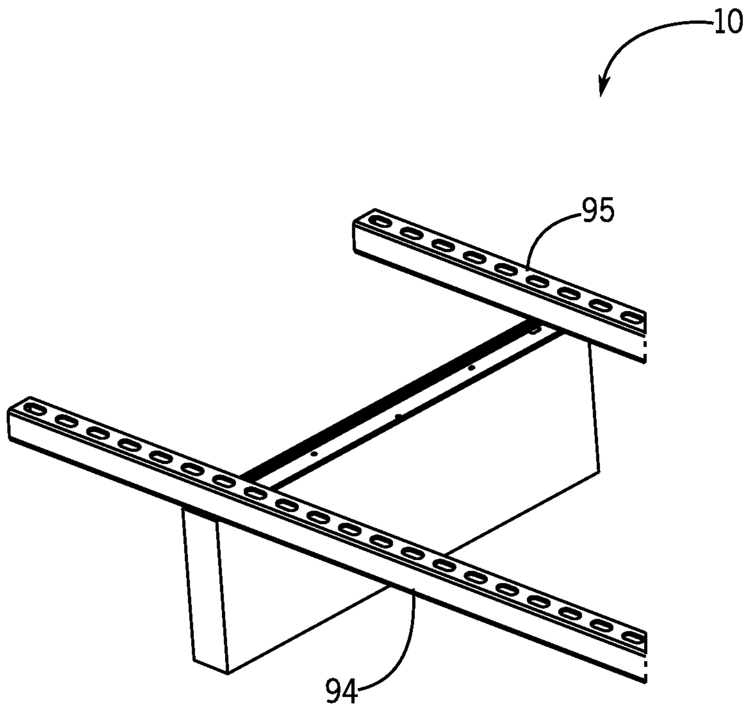
FIGS. 23 and 24 are perspective views of an example of the present invention illustrating its attachment to a strut element that is in turn suitable for attachment to a ceiling.
Figure 24:
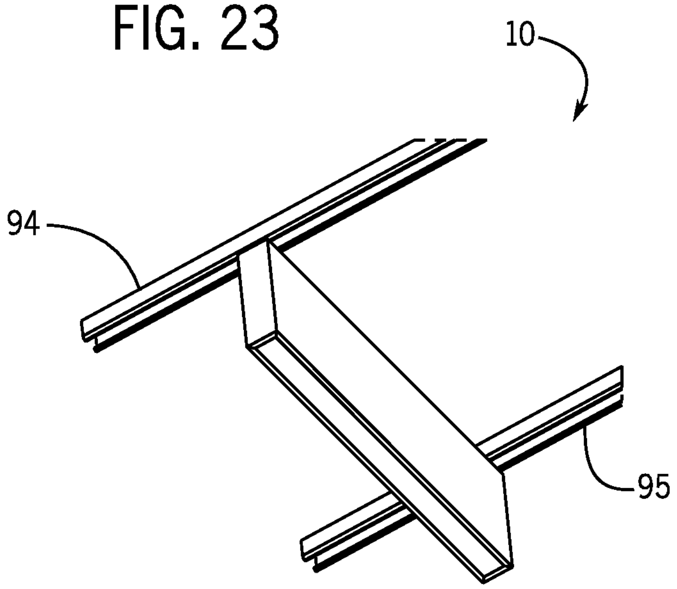
Figure 25:
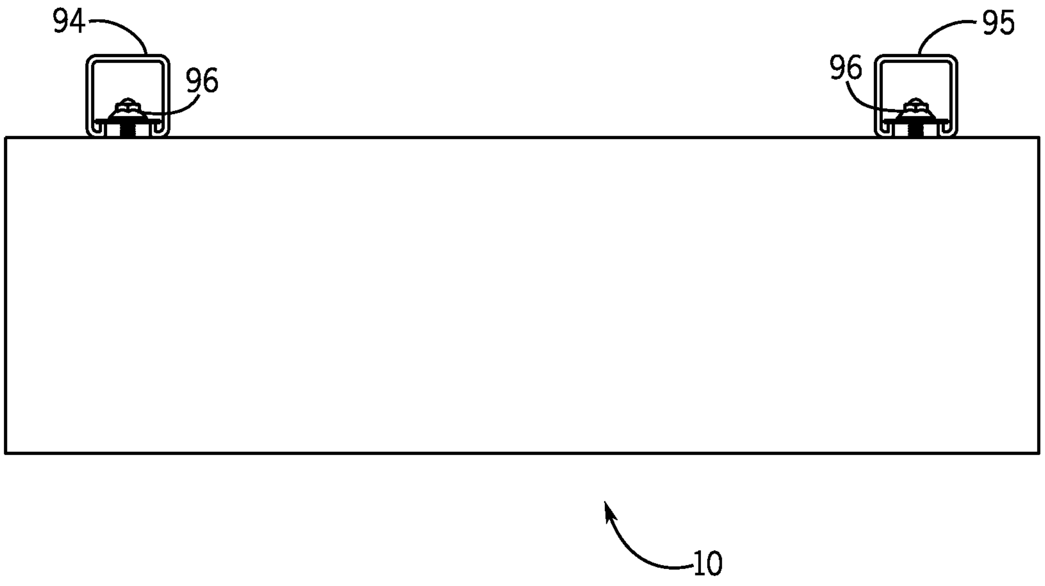
FIG. 25 is a front elevational view of the example of the present invention illustrated in FIG. 23.

FIGS. 23-25 illustrate the use of strut elements 94 and 95 secured to the top portion of fixture 10 which serves to suspend and secure fixture 10 to a ceiling. In the example shown in FIG. 25, U shaped struts 94 and 95 and the top brace 92 (shown in FIG. 22) are tensioned and locked together by nut 96 threaded onto rod 53.

Figure 26:
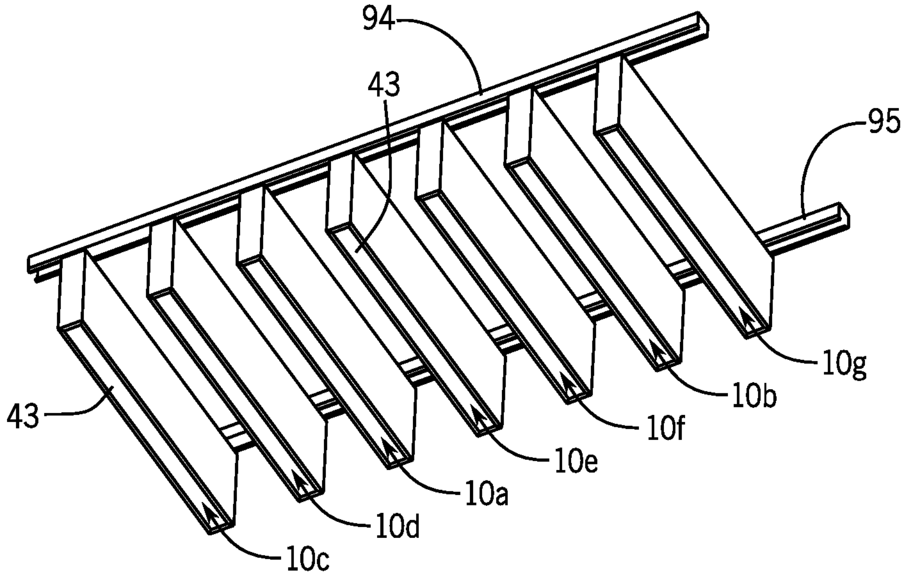
FIG. 26 is a perspective view of an example of the present invention in which an array of sound absorbing panels composed of panels that include lighting elements interspersed among panels that exclude lighting elements.

FIG. 26 illustrates an example of the present invention comprising an assembly formed of a plurality of sound absorbing fixtures, some with and some without lighting elements. In FIG. 26, fixtures 10 are virtually identical in appearance to one another except for their bottom panels. When constructed according to the present invention, some, but not all of the fixtures, provide a light-producing, sound absorbing structure array that, from many angles makes it difficult to perceive the source from which light originates. Fixtures 10*a* and 10*b* are each affixed to struts 94 and 95, such as may be mounted to structure. Fixture 10*a* and 10*b* can be light producing fixtures, while the remaining fixtures 10*c*-10*g* are non-lit fixtures. In order to provide aesthetic continuity between lit fixtures 10*a* and 10*b* and unlit fixtures 10, unlit fixtures 10*c*, 10*d*, 10*e*, 10*f* and 10*g* may be provided with a lens 43 positioned on the downward facing surface thereof. Lens 43 in said unlit fixtures may be clear or frosted or painted as described above.

Figure 27:
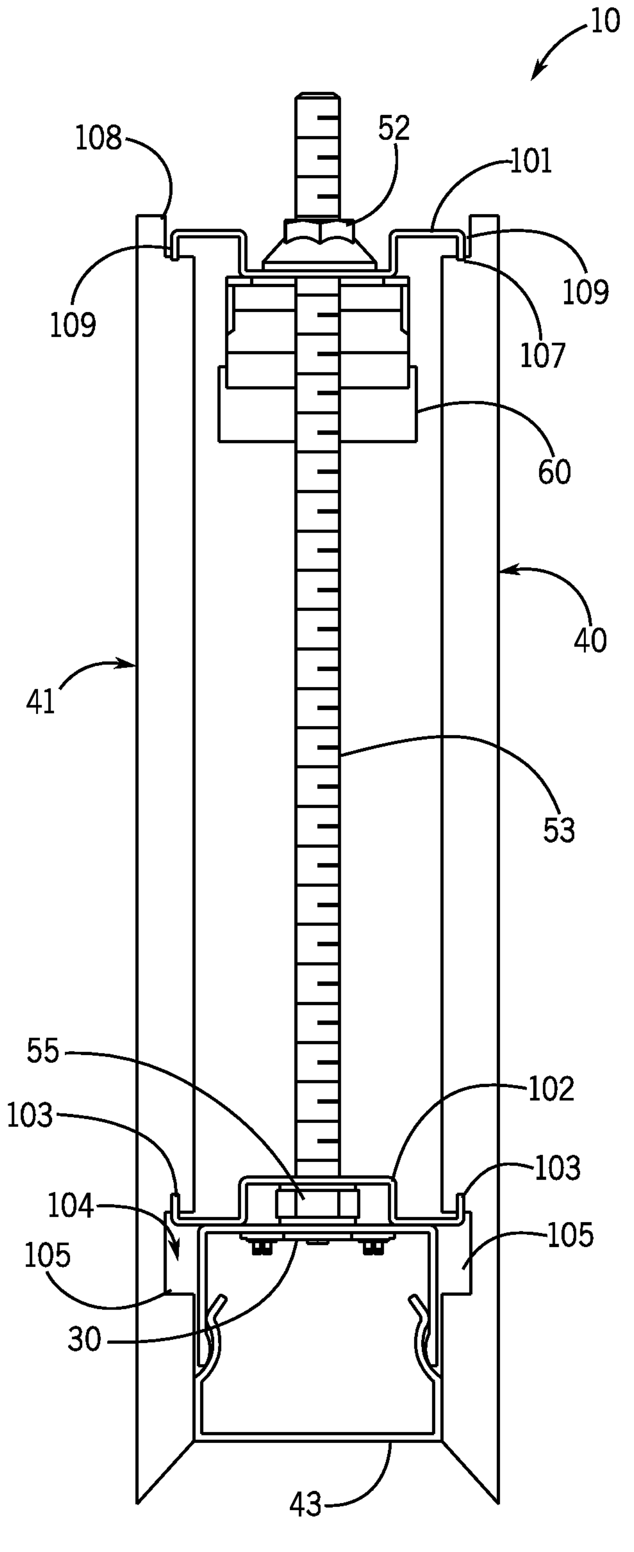
FIG. 27 is an elevated front view of the interior of a further example of the present invention, in which the end caps are not shown.
Figure 28:
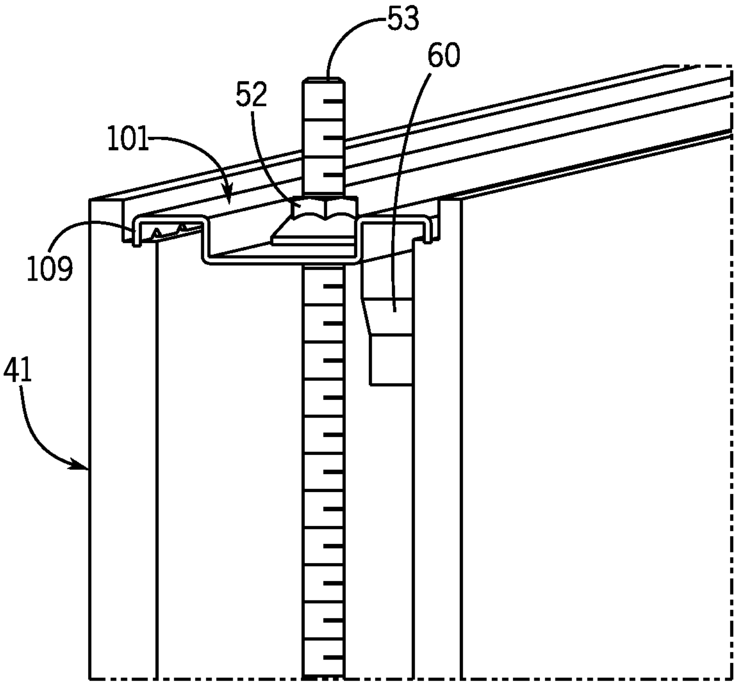
FIG. 28 is a perspective view of the lighting fixture as shown in FIG. 27, highlighting, in part, the upper support structure and LED driver.
Figure 29:
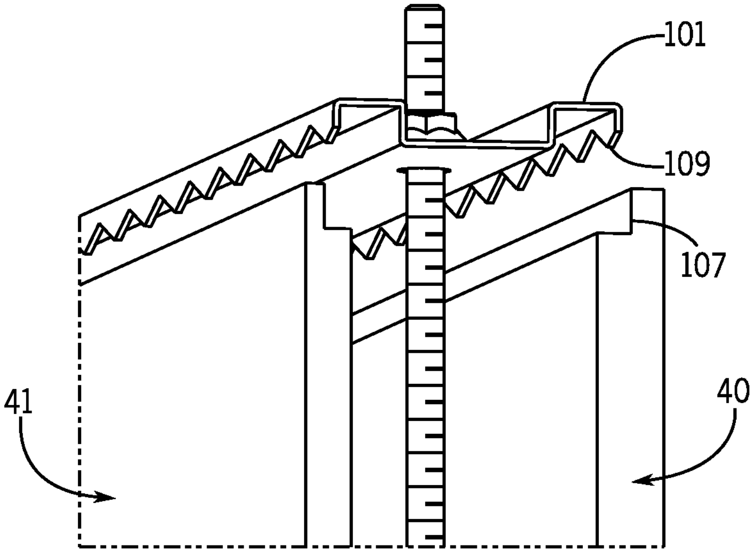
FIG. 29 is a perspective view of the lighting fixture as shown in FIG. 27, highlighting, in part, the upper support structure.

FIGS. 27-29 illustrate another example of the present invention in which upper support structure 101 is provided with a plurality of downward facing teeth 109 that partially penetrate and "bite" into the upper facing edges 107 of acoustic panels 40 and 41, in which lower support structure 102 is provided with a plurality of upward facing teeth 103 that partially penetrate and "bite" into the lower facing interior edges of channels 105 of acoustic panels 40 and 41. Upper and lower support structures 101 and 102 are tensioned and drawn toward one another by nuts 52 and 55 that, in turn, secure each of support structures 101 and 102 to acoustic panels 40 and 41. Linear support structure 104 is secured to the bottom facing surface of lower support 102 which in turn provides an attachment point for lens 43. Lower LED board 30 is likewise secured to the bottom facing surface of linear support structure 104.

Figure 30:
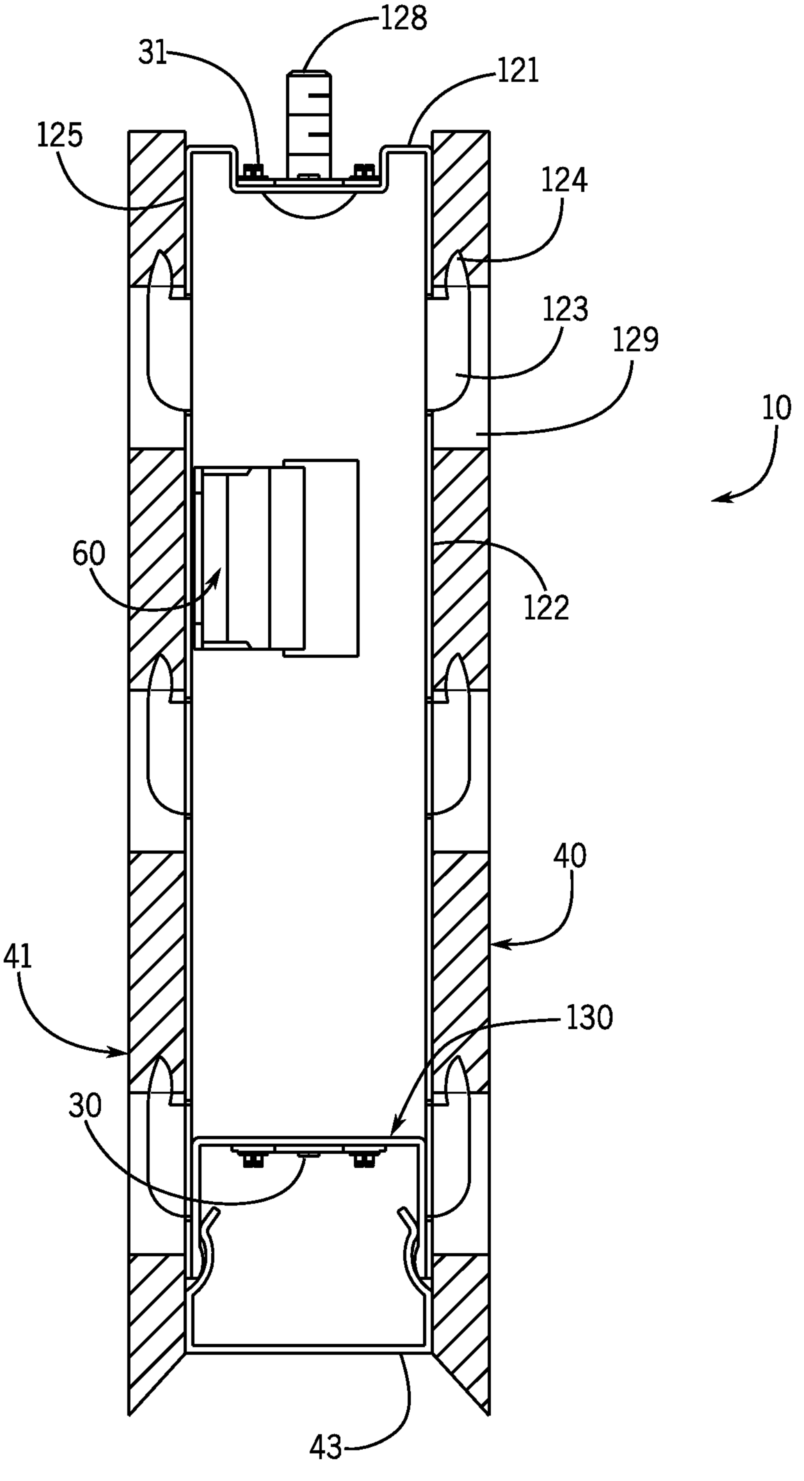
FIG. 30 is an elevated front view of the interior of an example of the present invention, in which the end caps are not shown.
Figure 31:
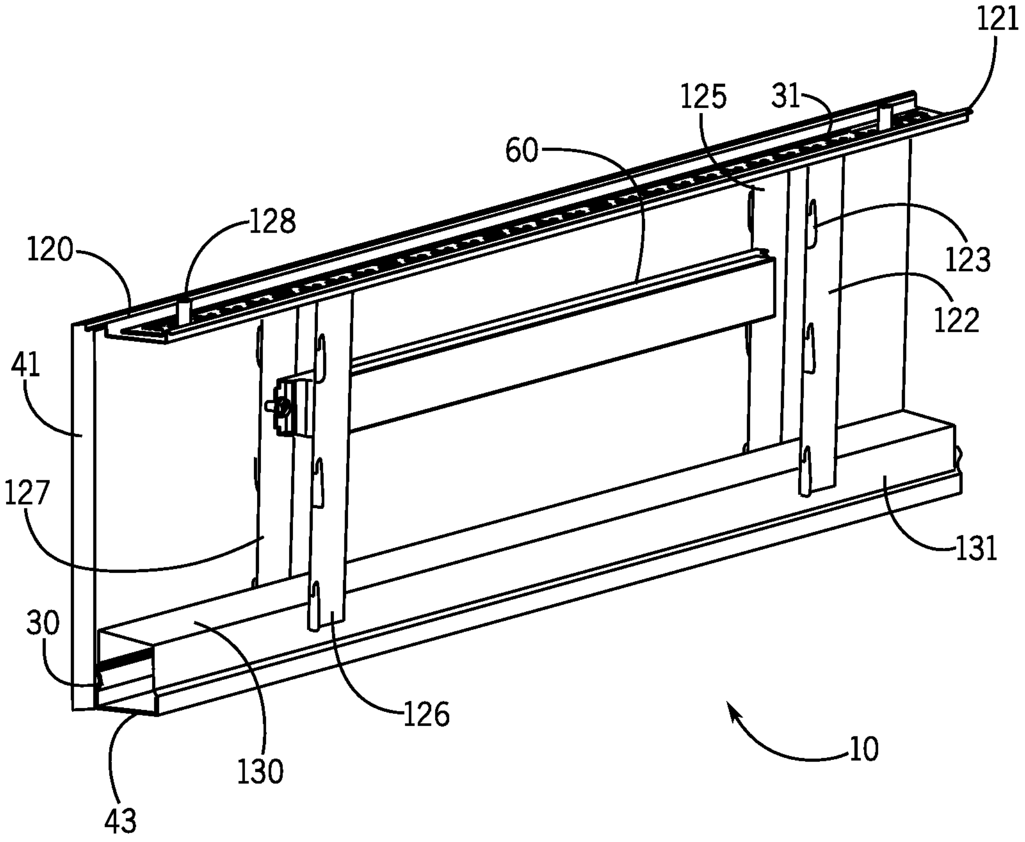
FIG. 31 is a perspective view of the lighting fixture as shown in FIG. 30, highlighting, in part, the upper support structure, lower support structure, vertical support braces, and LED driver.
Figure 32A:
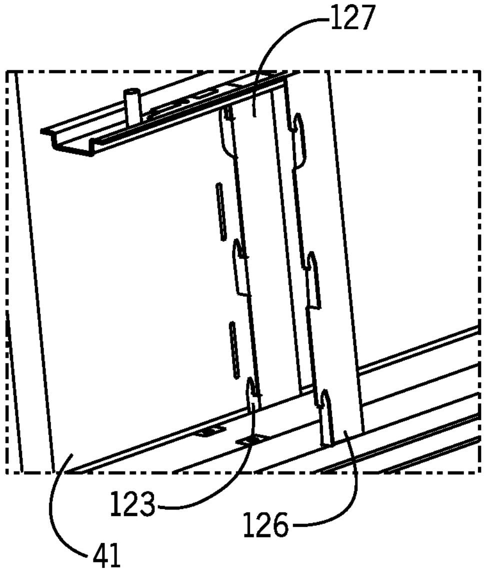
FIGS. 32A-D are perspective views of the lighting fixture shown in FIG. 30, highlighting, in part, the sequential attachment of an acoustic panel to the internal panel braces.
Figure 32B:
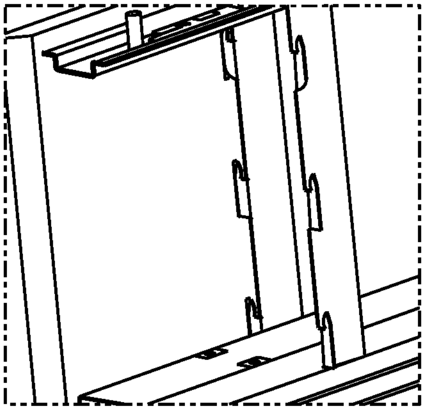
Figure 32C:
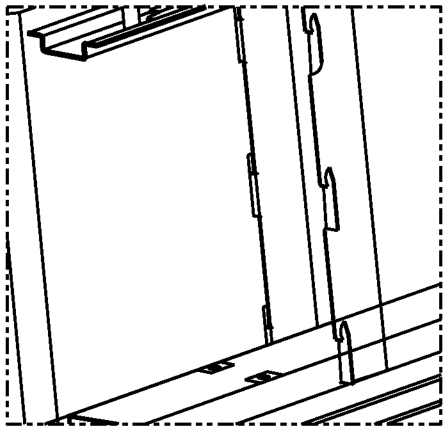
Figure 32D:
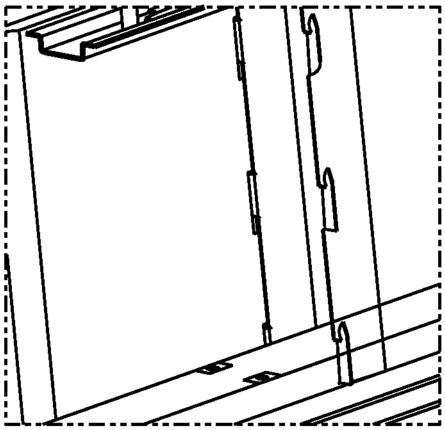

FIGS. 30 and 31 illustrate another example of the present invention in which internal panel braces 122, 125, 126 and 127 are vertically interposed and secured to the outward facing edges of upper support structure 121 and lower support structure 130. In the example illustrated, upper linear support structure 121 and lower linear support structure 130 are fabricated of formed sheet metal. Each of internal panel braces 122, 125, 126 and 127 include a series of aligned upward facing tabs, such as tab 123, that engage with slots pre-formed in acoustic panels 40 and 41, as further shown in FIGS. 32A-32 D. In particular, tabs, such as tab 123, are formed perpendicular to the body of each brace and each has a pointed tip 124.

While the fixture as illustrated includes two pair of panel braces, additional pairs of braces could be provided as appropriate to accommodate lighting fixtures of longer lengths. Upper support structure 121 is shown in FIG. 31 as including an optional upper facing LED board 31 and further including support rods, such as rod 128, for suspending the lighting fixture from a ceiling or other overhead structure.

FIGS. 32A-D illustrate the sequential installation of acoustic panel 41. Acoustic panel 41 includes a series of vertical aligned pre-formed slots 129 which accept tabs 123. To install acoustic panels 40 and 41, slots 129 in each panel are aligned with corresponding tabs 123, as shown in FIG. 32 B. Once fully inserted, as shown in FIG. 32 C, the panel 41 can be moved downward and locked into place such that upward facing tip 124 is driven into the panel material, FIG. 32 D.

Figure 33:
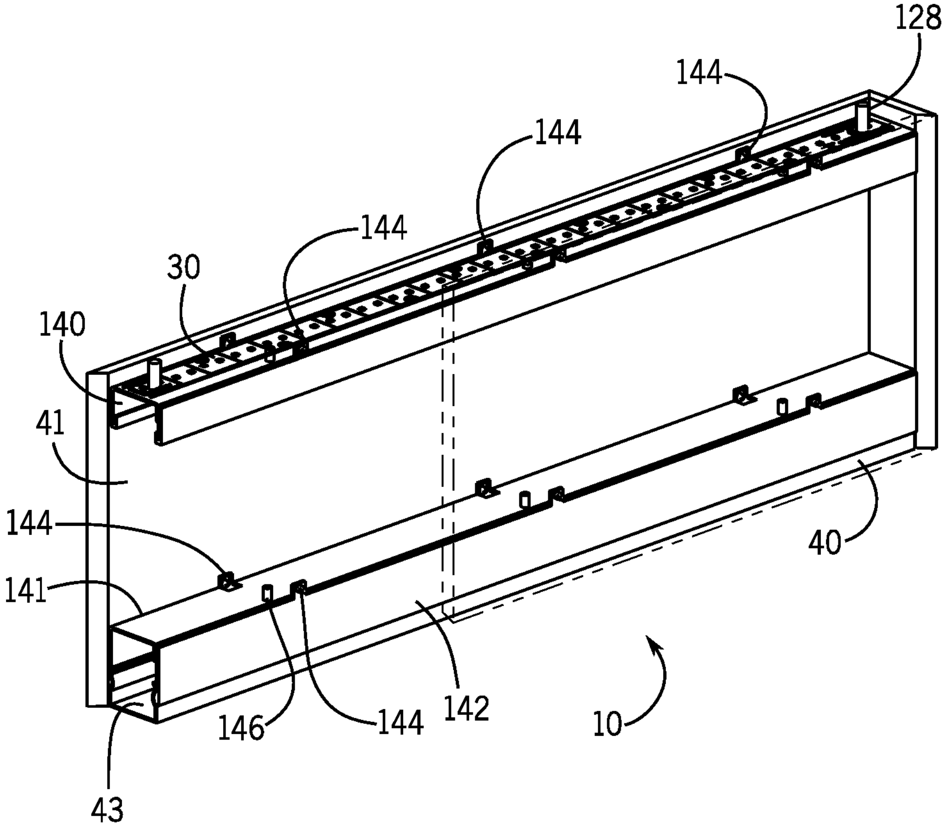
FIG. 33 is a perspective view of an example of the present invention, in which one end cap is shown.

FIG. 33 is a perspective view of an example of the present invention in which acoustic panels 40 and 41 comprise structural elements of the acoustic lighting fixture and are joined to upper and lower 2-piece LED trays. As further illustrated in FIG. 33, lower LED tray 140 L includes a U shaped channel member 141 and corresponding side channel 142.

As shown in FIGS. 34 and 35A, channel 141 can be configured to cooperate with and suspend acoustic panel 41 through the use of screw 144, with threaded region 141 *t* of screw 144 holding acoustic panel flush against channel 141. Channel 142, which includes locking tabs 147, is likewise secured to acoustic panel 40 by threaded region 142 *t* of screws 144. Upper LED tray 140 (see FIG. 33) is formed in a similar manner. The use of an upper and lower LED tray orientated between two acoustic panels eliminates the need for a singular mounting spine.

FIGS. 34, 35 A-35 C illustrate the sequential assembly of the two halves of fixture 10 wherein the two LED trays are locked together by clips or tabs in a bayonet fashion. Specifically, locking tabs 147 are inserted into slots 141 *s* and the panels are moved relative to each other in a reciprocating manner. Screw 146 further serves to secure the two fixture halves together.

Figure 36:
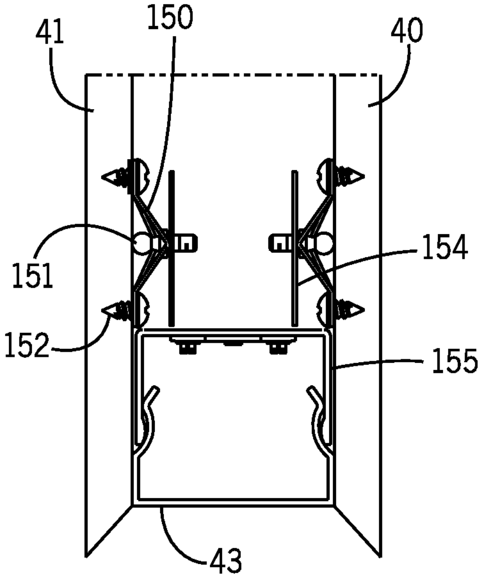
FIG. 36 is an elevated front view of a portion of the interior of an example of the present invention, in which the end caps are not shown.
Figure 37:
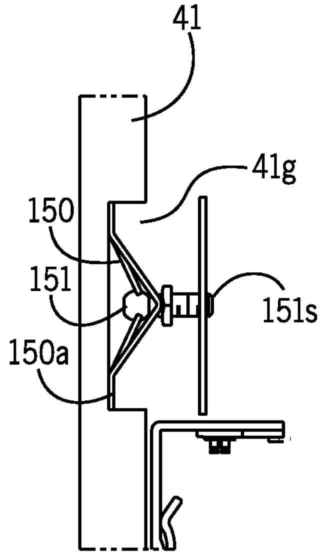
FIG. 37 is an elevated front view of the interior of an example of the present invention, in which the end caps are not shown.
Figure 38A:
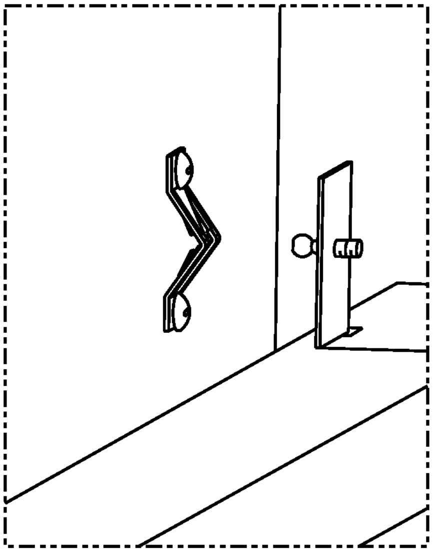
FIGS. 38A—B are perspective views of a portion of the lighting fixture shown in FIG. 36 highlighting, in part, the sequential attachment of an acoustic panel.
Figure 38B:
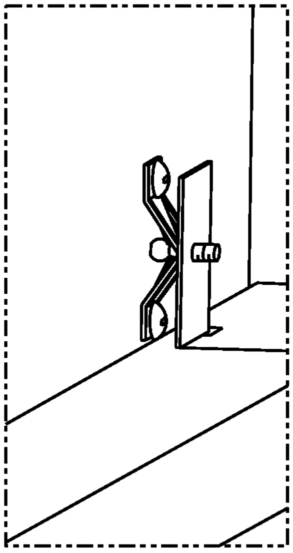

FIG. 36 illustrates an alternative mechanism for securing acoustic panels 40 and 41, and in particular, a pinch and capture fastener. Fastener 150 is secured to an inner facing surface of each acoustic panel 40 and 41 by screws 152. Threaded stud 151 is secured to an internal support structure composed of channels 154 and 155. Fastener body 150 may alternatively be secured in groove 41 *g* by inserting legs 150*a* into slots formed therein, or by adhesive, not shown. Spherical stud 151 is inserted into and captured by fastener body 150 and held in a fixed position, as sequentially illustrated further in FIGS. 38 A and 38 B. Other stud and receptacle fasteners are also suitable for securing the acoustic panels to the fixture.

Figure 39:
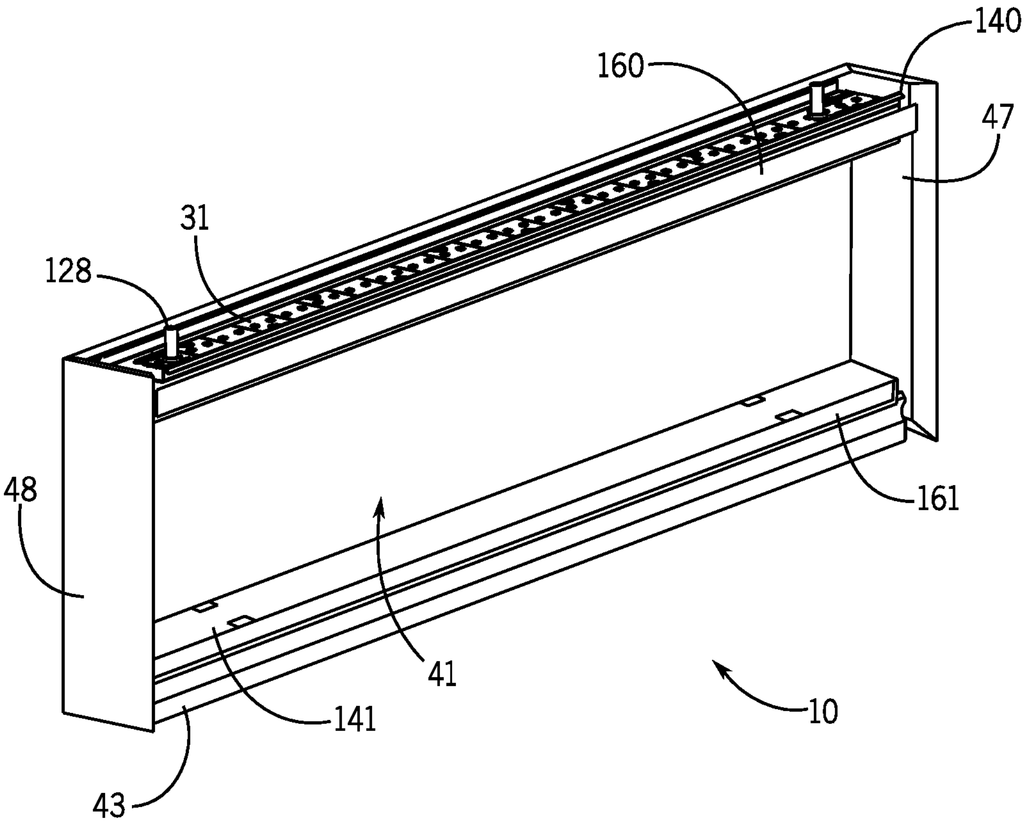
FIG. 39 is a perspective view of an example of the present invention, in which both end caps are shown.

FIG. 39 illustrates an example of the present invention wherein adhesive strips (such as double sided tape) 160 and 161 are applied, respectively, to upper LED tray 140 and lower LED tray 141 which serve to accept and secure acoustic panels 40 and 41 and end panels 47 and 48 attached thereto. Reference to the use fasteners and adhesives to secure acoustic panels 40 and 41 deemed to further encompass mechanical, thermal, chemical or adhesive fastening means.

While various fastener mechanisms for securing acoustic side panels 40 and 41 to internal panel braces or linear support structures are disclosed herein, it should be appreciated that several of the disclosed, and still other, fastener mechanisms may be combined with one another to achieve the same purpose. For example, in one embodiment of the present invention, the use of tabs 123, that engage with slots pre-formed in acoustic side panels 40 and 41, as shown in FIGS. 30, 32A-D, 41 and 44, may be used to secure the top-most edge of acoustic side panels 40 and 41, while a version of tab 123 modified to omit pointed tip 124 may be used to position and align, the bottom most edge of acoustic side panels 40 and 41 relative to corresponding lateral internal brace 190-197. Adhesive, in either liquid form, or via double-sided tape, may be used to secure the lower-most edge of acoustic side panels 40 and 41 thereby integrating opposing sides 40, 41 of acoustic material into fixture 10.

Figure 40:
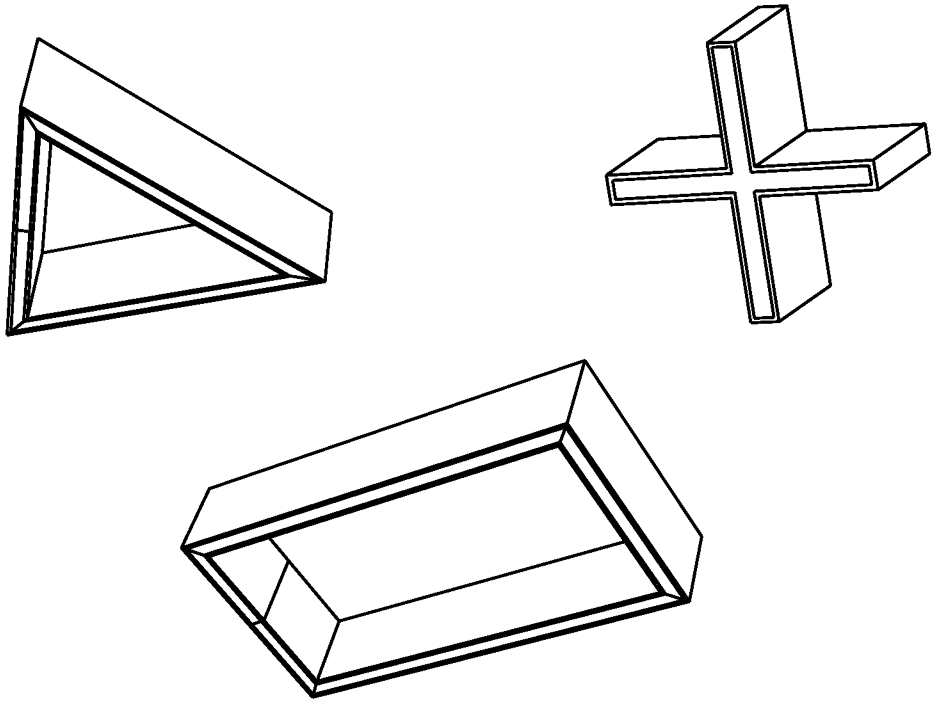
FIG. 40 is a perspective view of various shaped lighting fixtures that can be assembled using the principles of the present invention.

FIG. 40 illustrates a perspective view of various shaped lighting fixtures that can be assembled using the principles of the present invention.

As can be appreciated, the present invention provides numerous advantages, including offering a scalable construction, for example, permitting acoustic side panels of various heights to be used, replacing otherwise costly and heavy metallic traditional housing structures—all in the example of a modular construction. For example, dovetail grooves 42 additionally serve to facilitate "in field" trimming or cutting of acoustic panels 40 and 41, as needed, to reduce overall fixture height or otherwise adapt the fixture to a particular installation.

It is additionally contemplated that one or both of the front and/or rear ends of the generally linearly shaped fixture may include connection means to join two or more fixtures together in succession to form a longer continuous fixture. It is further contemplated that one or both such ends could be fitted with a connector that permits two or more fixtures to be joined to form shapes other than straight ones, such as "L", "T" or star shaped configurations.

FIGS. 41-45 illustrate an example of the present invention in which internal panel braces 190-197 are vertically interposed and secured to the inward upward facing surface of lower linear support structure 130 and the inward lower facing surface of upper linear support structure 121. Each of internal panel braces 190-197 includes a series of aligned upward facing tabs, such as tab 123 (see FIG. 44), that engage with slots 129 pre-formed in acoustic panels 40 and 41, as shown in FIGS. 32A—D. In particular, tabs, such as tab 123, are formed perpendicular to the body of each brace and each has a pointed tip 124.

While the fixture as illustrated includes eight panel braces, fewer or additional panel braces may be provided as appropriate to accommodate lighting fixtures of shorter or longer lengths, and lesser or greater weights, respectively.

Figure 41:
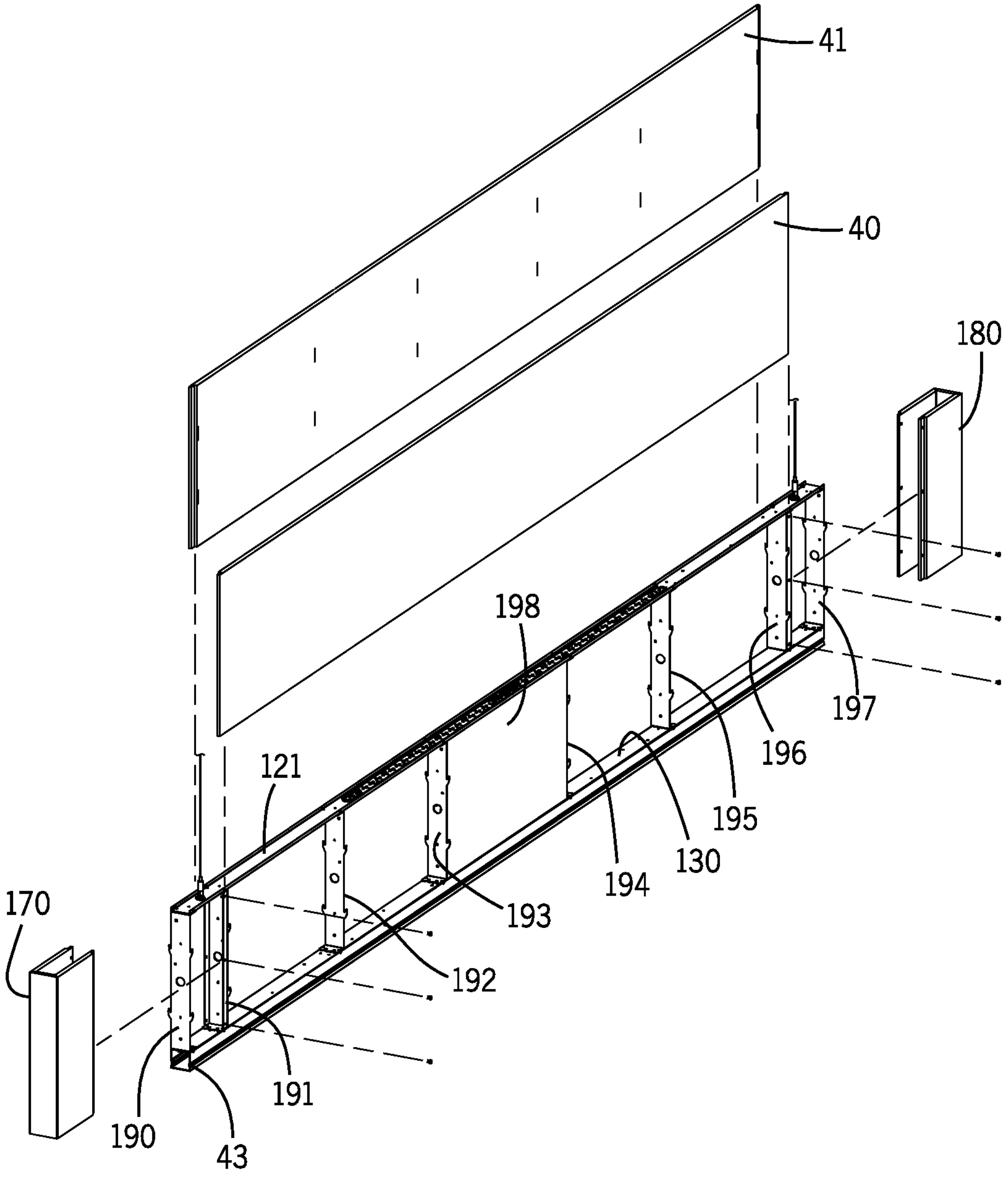
FIG. 41 is a perspective exploded view of lighting fixture as shown in FIG. 30, highlighting, in part, example of the end caps and vertical support braces.

As shown in FIG. 41 lower support structure 130 includes a lower facing LED board 30 (See FIG. 30), covered by lens 43. Upper support structure 121 as shown in FIG. 41 may include an optional upper facing LED board 31 (See FIG. 30). LED driver 60 is positioned between and supported by braces 193 and 194 and enclosed by shield 198. Support rods, such as rods 50, may be attached to upper support structure 121 for suspending the lighting fixture from a ceiling or other overhead structure.

Figure 42:
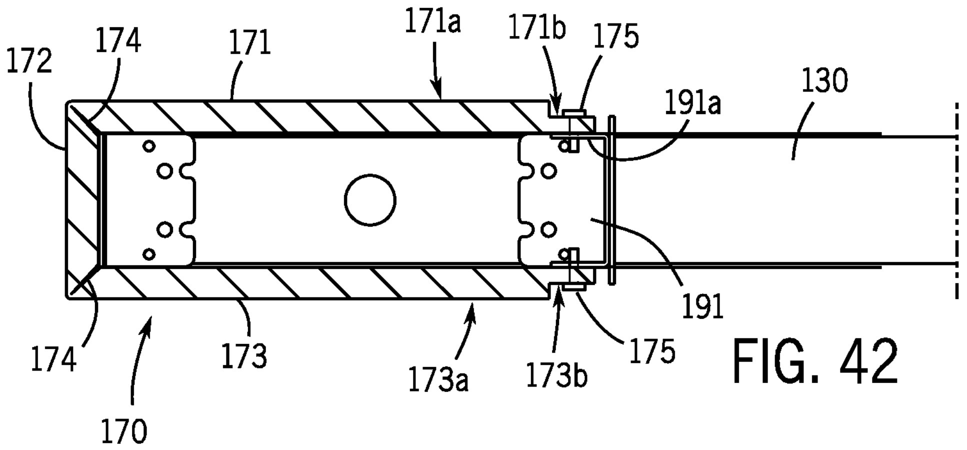
FIG. 42 is a bottom plan view of one of the end caps as shown in FIG. 41.
Figure 43:
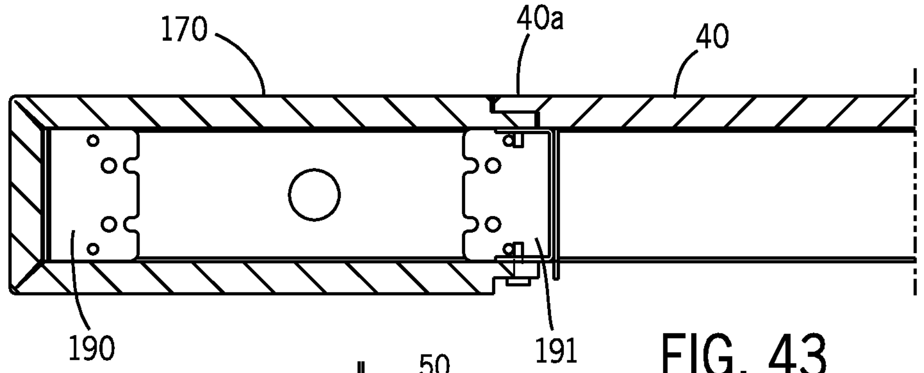
FIG. 43 is a bottom plan view of one of the end caps as shown in FIG. 41 overlapped by an acoustic side panel at a lap joint.
Figure 44:
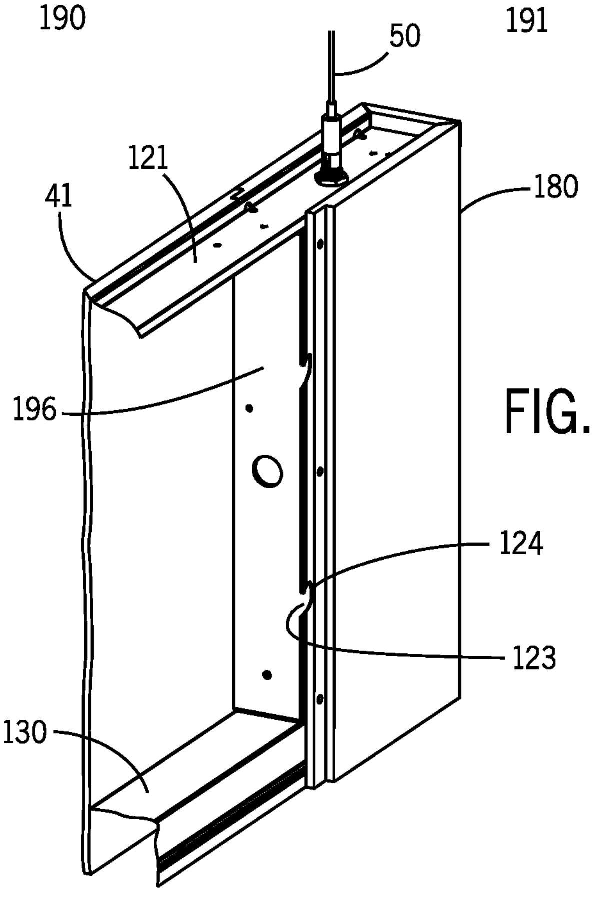
FIG. 44 is a perspective view of the lighting fixture as shown in FIG. 30, highlighting, in part, an example of the vertical support brace.

FIGS. 42-44 illustrate end caps 170 and 180 together with their installation onto panel braces 191 and 196, as well as their attachment to acoustic side panels 40 and 41. End cap 170 is formed of a single piece of acoustic material. Miter cuts 174 permit articulation of the material to form a substantially "U" shaped end cap 170 having side 171, end 172 and side 173. End cap ends 171*a* and 173*a* have a reduced thickness, 171*b* and 173*b*, respectively and overlap internal brace 191. Screws 175 secure end cap 170 to internal brace 191. In order to account for potential deviations in the dimensions of the various fixture components and to minimize any gap between end caps 170 and 180 and adjacent acoustic side panels 40 and 41, internal braces, such as braces 190, 191, 196 and 197 may include oval apertures, to be adjustable laterally and angularly to accommodate screws 175, to permit some flexibility in the positioning of end caps 170 and 180 with respect to acoustic side panels 40 and 41. Alternative fastening means are deemed within the scope of the present invention. End 40*a* of acoustic side panel 40 has a reduced thickness 40*b* such that when joined to lower and upper support structures 121 and 130, end 40*a* of acoustic side panel 40 overlaps end 171*a* of end cap side 171 to form a half-lap joint and a provide smooth transition and even thicknesses along the entire lateral length of lighting fixture 10. End cap side 173 is corresponds to end cap side 171 and similarly creates a half-lap joint when overlapped by acoustic side panel 41. End cap 180 and the adjacent edges of modular acoustic panels 40 and 41 correspond to end cap 170.

FIG. 43 further illustrates internal brace 191 as including flange 191*a* affixed thereto by screws or adhesive (not shown) to facilitate the attachment of end cap side 171 to internal brace 191. Internal brace 191 and each of internal braces 190-197 include a series of upward facing tabs, such as tab 123 (FIG. 44), each having pointed tip 124.

As further shown in FIGS. 42 to 44, the sequential installation of modular acoustic panels 40 and 41 begins with installation of end caps 170 and 180, as described above. Each of acoustic panels 40 and 41 include a series of vertical aligned pre-formed slots 129 (FIG. 41) which accept tabs 123. To install acoustic panels 40 and 41, slots 129 in each panel are aligned with corresponding tabs 123 and locked into position, as shown in FIG. 32 B. Once fully inserted, acoustic panels 40 and 41 serve as structural elements of the acoustic lighting fixture 10, and are joined to upper and lower 2-piece LED trays with half-lap joints formed at each panel end to create a smooth even surface along each lateral side of fixture 10. While the example of the fixture illustrated in FIGS. 41-44 has a generally linear shape, the fixture could alternatively be constructed in other geometric shapes, including curved and cylindrical shapes, with appropriate modification to the various support structures, internal braces and acoustic baffle components.

Figure 45:
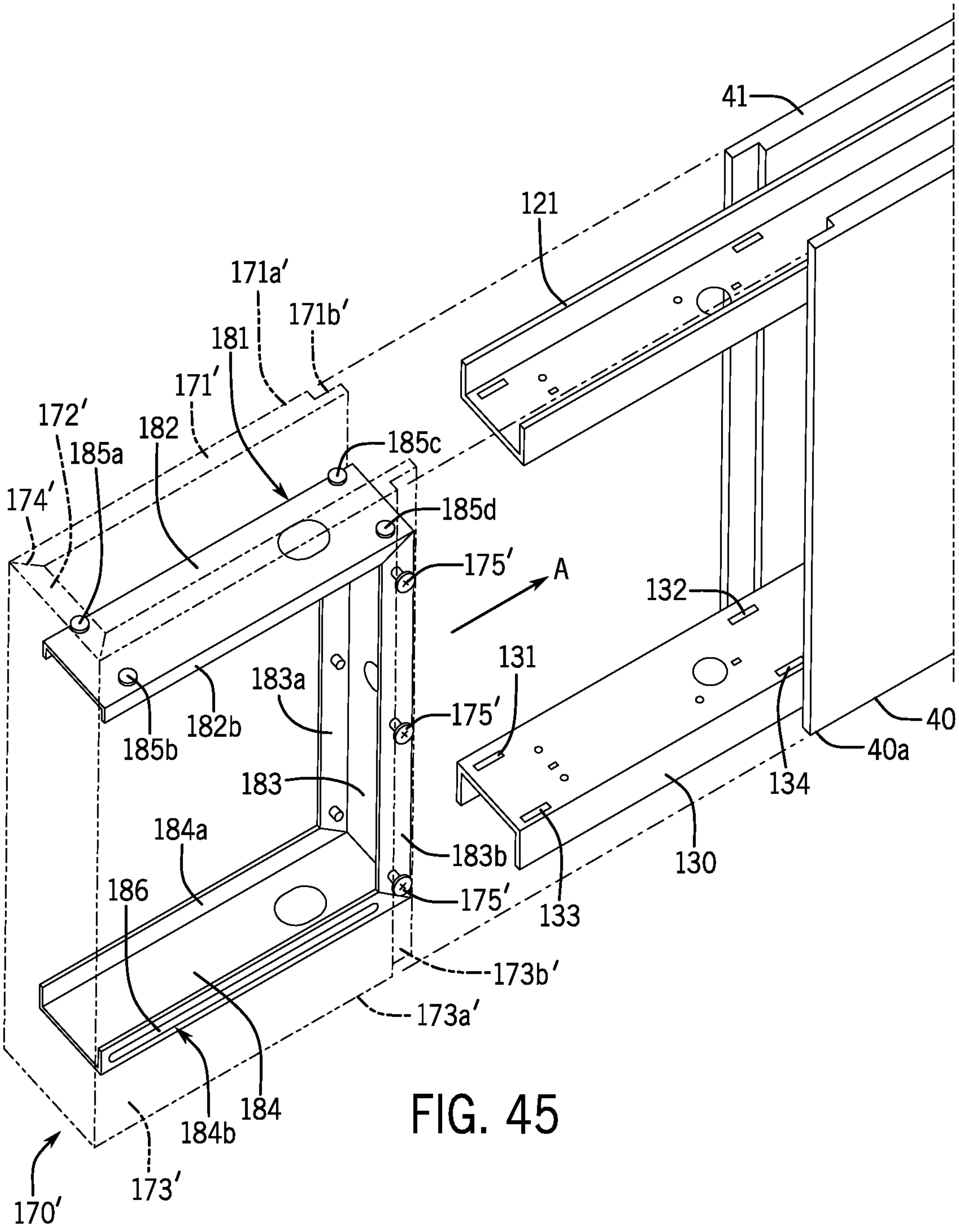
FIG. 45 is a perspective view of an example of the lighting fixture as shown in FIG. 30, highlighting, in part, an internal support structure within the end caps.
Figure 46:
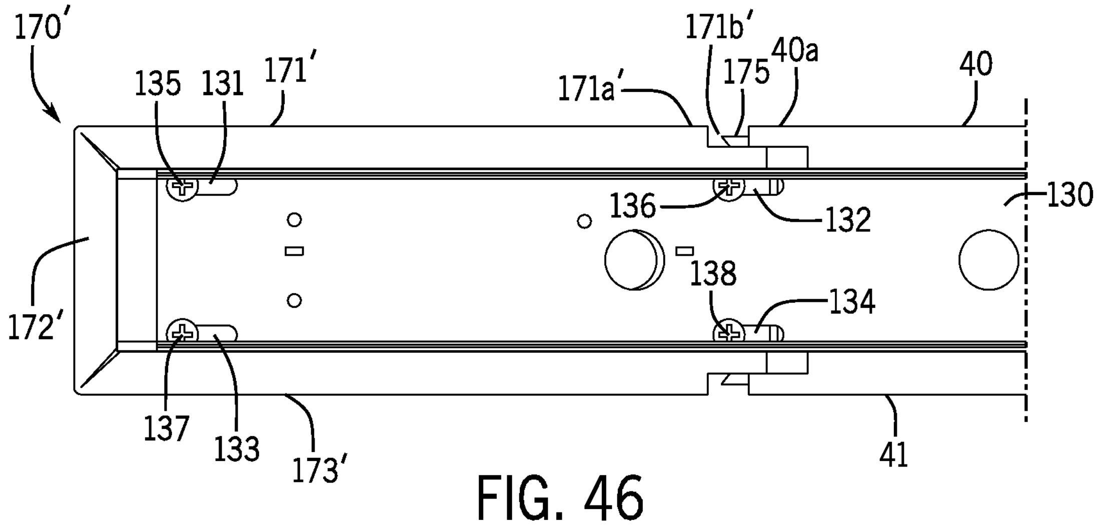
FIG. 46 is a bottom (or top) plan view of one of the end caps as shown in FIG. 45.
Figure 47:
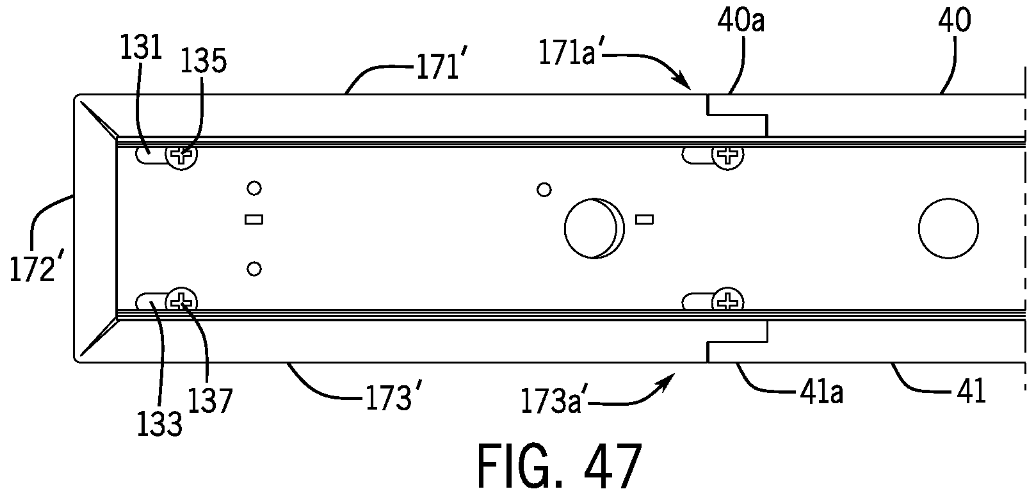
FIG. 47 is a bottom (or top) plan view of one of the end caps as shown in FIG. 45 overlapped by an acoustic side panel at a lap joint.

FIGS. 45-47 illustrate an alternative to end cap 180, in the embodiment of end cap 170, for telescopic installation into fixture 10, as well as its positioning with respect to acoustic side panels 40 and 41. FIG. 45 illustrates end cap 170 (shown in ghosted lines so as to highlight the associated internal support structure 181) formed of a single piece of acoustic material. Miter cuts 174 permit articulation of the material to form a substantially "U" shaped end cap 170 having side 171, end 172 and side 173, which is affixed to internal support structure 181 as described below. End cap ends 171*a* and 173*a* have a reduced thickness, 171*b* and 173*b*, respectively. End 40*a* of acoustic side panel 40 has a reduced thickness such that when joined to lower and upper support structures 121 and 130, end 40*a* of acoustic side panel 40 overlaps end 171*a* of end cap side 171 to form a half-lap joint and a provide smooth transition and even thicknesses along the entire lateral length of lighting fixture 10. End cap side 173 corresponds to end cap side 171 and similarly creates a half-lap joint when overlapped by acoustic side panel 41.

End cap 170 includes internal support structure 181 comprising upper cap support member 182, vertical cap support member 183 (which replaces internal braces 190 and 191 of FIG. 41) and lower cap support member 184. Each of upper cap support member 182, vertical cap support member 183 and lower cap support member 184 include perpendicular flange walls, 182*a* and 182*b*, 183*a* and 183*b*, and 184*a* and 184*b*, respectively. Each of upper cap support member 182 and lower cap support member 184 includes screw holes 185*a*-185*d* that accept screws 135-138 shown in FIGS. 46 and 47.

Internal support structure 181 is preferably fabricated of a single length of sheet metal, mitered and folded to form a substantially "C"-shaped structure around which end cap 170 is secured. In another embodiment, internal support structure 181 may include an additional vertical support member (not shown) extending between, and closing the open end of, upper cap support member 182 and lower cap support member 184. That additional vertical support member may resemble internal brace 190 and include a series of upward facing tabs, such as tab 123 (FIG. 44), each having pointed tip 124, that cooperate with slots formed in the inner facing surfaces of end cap sides 171 and 173, as describe above, to further secure end cap 170 to internal support structure 181. Through this structure end cap 170 can telescope into the existing fixture structure by prompting in direction A, and still enable the close alignment of the top and bottom portions of the mated acoustic material sections.

Screws 175 secure ends 171*a* and 173*a* to vertical cap support member 183 by joining reduced thickness areas 171*b* and 173*b* to perpendicular flange walls 183*a* and 183*b*. Various forms of fasteners, such as adhesive, including double sided tape 186, may be used to secure end cap sides 171 and 173 to upper cap support member 182 and lower cap support member 184.

In the alternative embodiment illustrated in FIGS. 45-47, upper and lower support structures 121 and 130 each include oval apertures 131-134 such that when end cap 170 is installed, a portion of each of apertures 131-134 aligns with screw openings 185*a*-185*d* of upper cap support member 182 and lower cap support member 184.

As further specifically illustrated in FIGS. 46 and 47, end cap 170 is installed onto fixture 10 by telescopically moving internal support structure 181 in direction A onto fixture 10 such that structure 181 is telescopically received by upper support structure 121 and lower support structure 130. In this embodiment, the downward facing surface of upper support structure 121 abuts the upward facing surface of upper cap support member 182, and the upward facing surface of lower support structure 130 abuts the downward facing surface of lower cap support member 184.

As illustrated in FIG. 46, screws 135-138 are used to secure lower cap support member 184 to lower support structure 130. Upper cap support member 182 is secured to upper support structure 121 in a similar manner.

The oval apertures within lower support structure 130 and within upper support structure 121 provide flexibility in the positioning of end cap 170 with respect to acoustic side panels 40 and 41 and permit end cap 170 to be laterally adjusted with respect to the adjacent ends of acoustic panels 40 and 41—to close any gap at either the top or bottom edges of fixture 10 thus accounting for potential deviations in the dimensions of the various fixture components.

Figure 48:
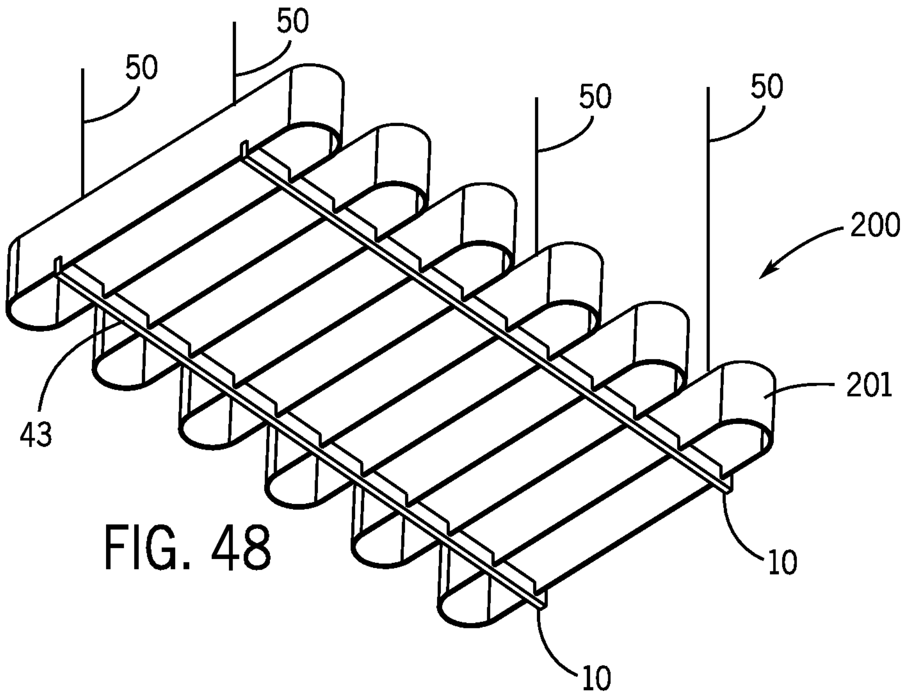
FIG. 48 is a perspective view of a fixture assembly according to the present invention, incorporating unlit acoustic panels supported by lighted or non-lighted fixture supports.

FIG. 48 is a perspective view of lighting fixture assembly 200 according to the present invention, incorporating a combination of lit and unlit acoustic panels. In the example illustrated, fixture 200 incorporates two lighting fixtures 10 constructed as described herein, as including acoustic side panels. Each lighting fixture 10 is configured to be suspended from a ceiling or other raised structure via cables 50. Lighting fixtures 10 may include one or both of upper and lower facing LED boards 30 and 31. Alternatively, lighting fixtures 10 may not incorporate acoustic panels.

Figure 49:
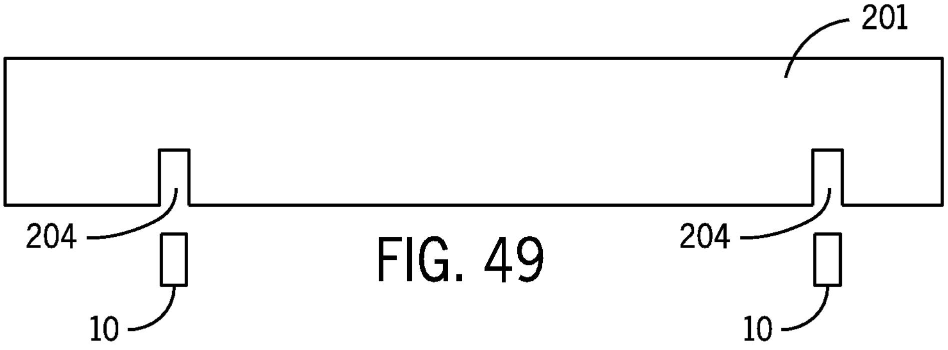
FIG. 49 is an elevated exploded side view illustrating the principles of a fixture according to FIG. 48.

In this example, race-track shaped acoustic baffles 201 are positioned above and perpendicular to each lighting fixture 10 and are supported by each fixture 10 as shown in FIG. 49. As shown in FIGS. 48 and 49, specifically, each acoustic panel 201 includes a notch or cut-out 204 having a width and height substantially equal to the cross-sectional width and height of fixture 10 so as to fit over and be held in place upon fixture 10, with or without additional fasteners.

Figure 50:
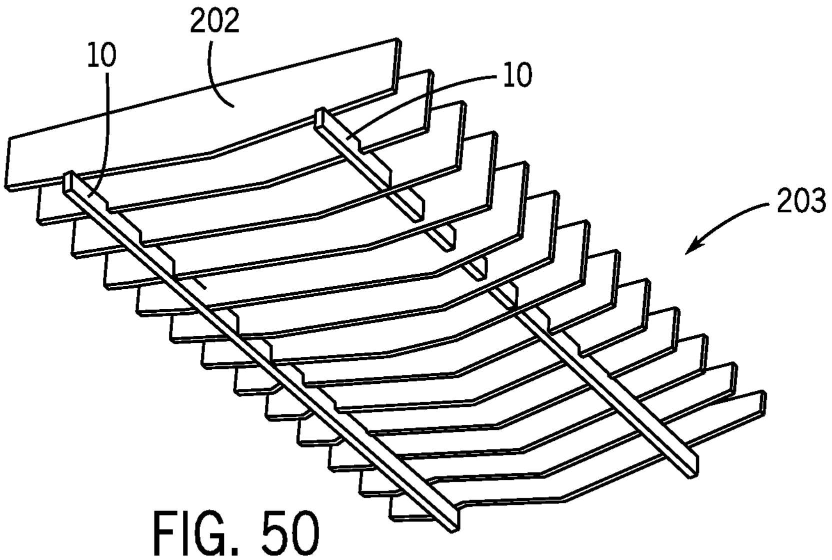
FIG. 50 is a perspective view an example of a fixture assembly according to the present invention, incorporating unlit acoustic panels, supported by lighted or unlighted fixture supports.

Another example of the above-described lighting fixture arrangement is illustrated as assembly 203 in FIG. 50. As shown, chevron-shaped acoustic panels (baffles) 202 are of a substantially planar form, each having a notch or cutout corresponding to a below positioned lighting fixture 10. The height of the notches in each panel 202, or of the baffles themselves, can vary from that of an adjacent panel 202 such the lower edge of each acoustic panel 202 does not necessary align with the lower surface of each lighting fixture 10.

The examples illustrated in FIGS. 48 and 50 include two lighted fixtures 10, each having unlighted acoustic panels or baffles 201 and 202 orientated perpendicular to fixture 10 to create lighting fixture assembly 200. Additional lighting fixtures and lighting fixture assemblies having acoustic panels or baffles orientated in a non-perpendicular manner are also deemed to be within the scope of the present invention.

Unlighted acoustic panels or baffles 201 and 202 of FIGS. 48-50 may also have a multi-ply construction and may include one or more internal support, or attachment brackets, or both, each fabricated of metal or of another suitably rigid material, which may be configured and positioned along panels 201 and 202 based, in part, upon the overall length of fixture 10. FIG. 51 illustrates an example of an internal brace bracket 210 suitable for use in fixtures 200 and 203 (of FIGS. 48 and 50). Internal brace bracket 210 includes an upper flange 207, a lower flange 208 and a vertical support member 209 configured to be inserted between two plies of acoustic material as illustrated in FIG. 52. In the example illustrated in FIG. 52, acoustic panel 202 is comprises of a single sheet of acoustic material folded in two, with internal brace bracket 210 inserted through a slot formed along the lower edge 203*c* of acoustic panel 202 and positioned between acoustic panel portions 202*a* and 202*b*, as represented by phantom lines 206. Flange 207 is configured to overlap and secure the upper edges of each of acoustic panel portions 202*a* and 202*b* by screws 207*a*. Lower flange 208 extends perpendicular to the side surface of acoustic panel 202. Adhesive, such as double sided tape, may be applied along the length vertical support member 209 to further secure acoustic panel portions 202*a* and 202*b* to one another.

Figure 53:
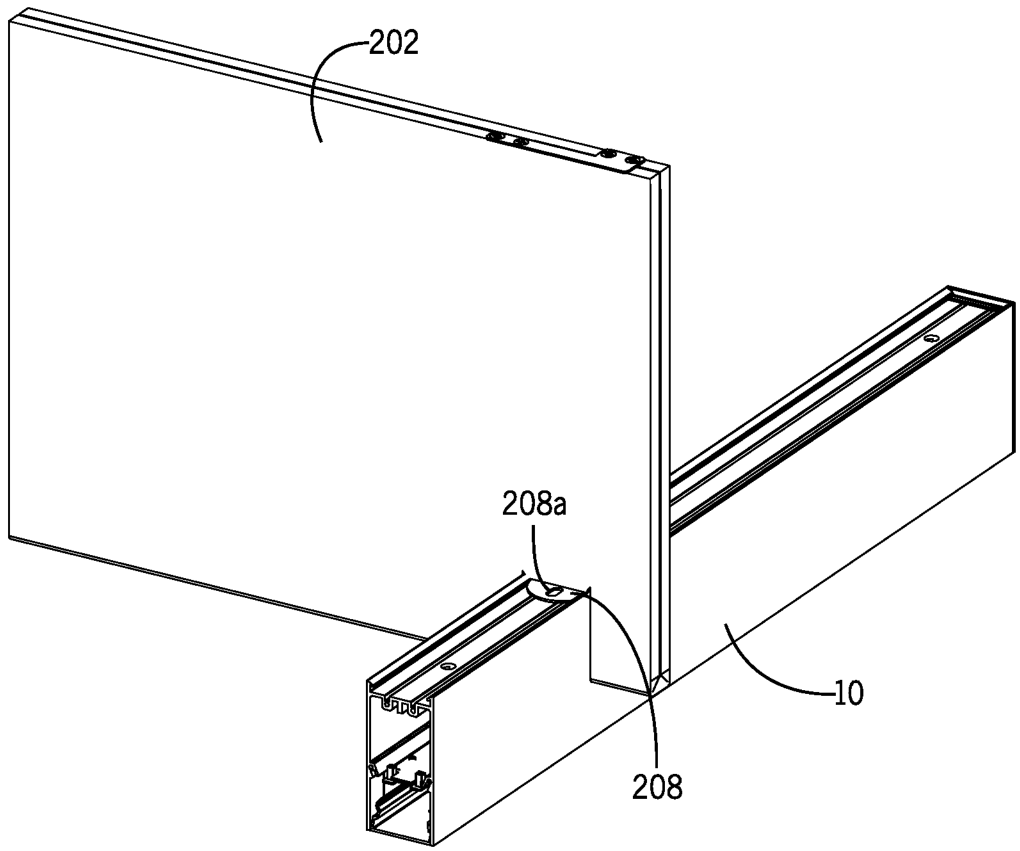
FIG. 53 is a perspective view of an unlit acoustic panel baffle structurally affixed to a lighted fixture, also for use in the embodiments of FIGS. 48 and 50.

FIG. 53 illustrates an example of the joinder of acoustic panel 202 to lighted fixture 10. In this example, acoustic panel 202 includes a notch or cutout 204 (See FIG. 49) which permits acoustic panel 202 to fit over fixture 10 with flange 208 positioned proximate the upper facing surface of fixture 10, such that acoustic panel 202 may be secured to fixture 10 by a screw (not shown) inserted through flange opening 208*a*.

Figure 54:
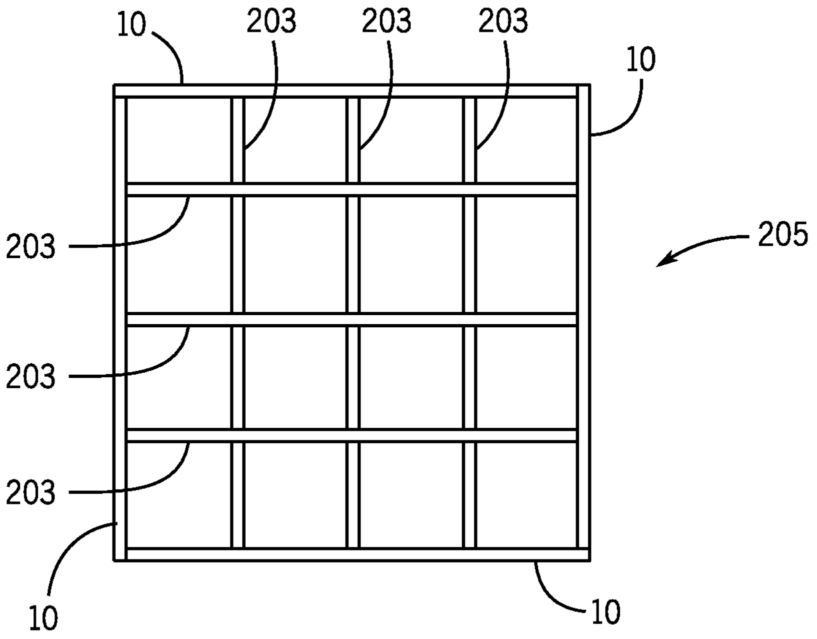
FIG. 54 is a bottom plan view of an example of the lighting fixture incorporating lighting fixtures orientated around the periphery of an assembly of acoustic panels or baffles positioned and aligned therewithin.
Figure 55:
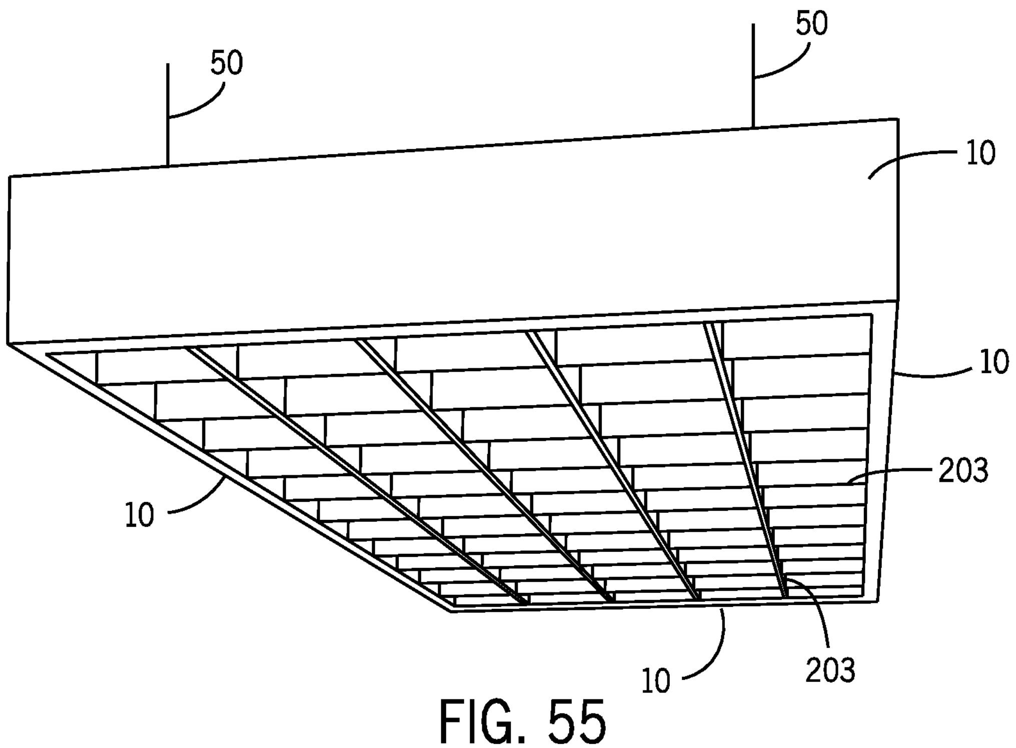
FIG. 55 is a perspective view of the fixture assembly according to FIG. 54, incorporating lighting fixtures orientated around the periphery of an assembly of acoustic panels or baffles positioned and aligned therewithin.

In the example of FIG. 54, a perspective view of which appears as FIG. 55, lighting fixture assembly 205 comprises four lighting fixtures 10 jointed at each end to one another in a square shape with unlit acoustic panels 203 arranged in an aligned cross-wise orientation within the area formed within the perimeter established by said lighting fixtures 10. In this example, acoustic panels 203 are notched to cooperate with the peripheral fixtures 10 and one another to dampen the ambient sound.

Figure 56:
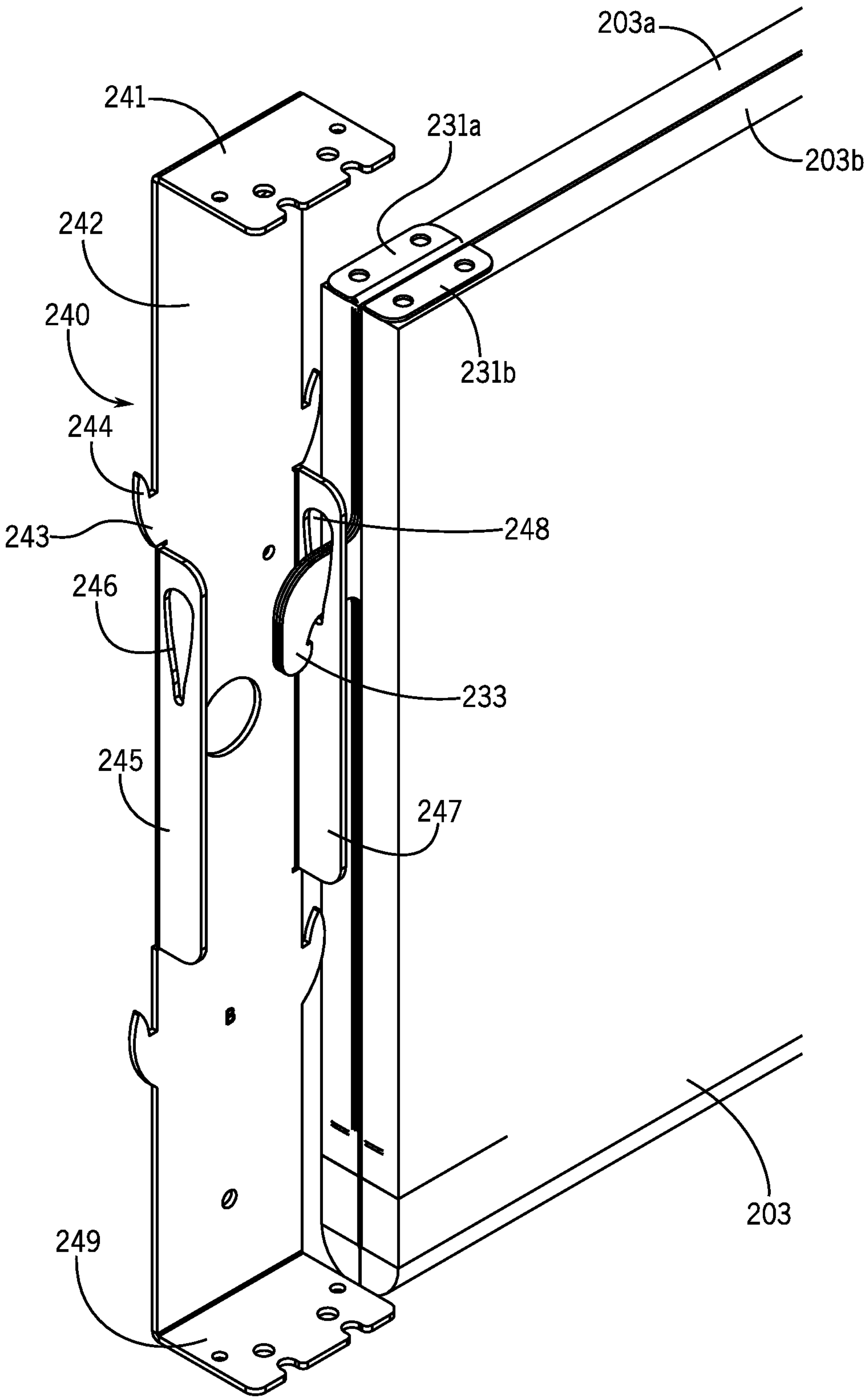
FIG. 56 is a perspective view of two-ply unlit acoustic panel joined to the lighted fixture of FIG. 55 via a baffle attachment bracket.
Figure 57:
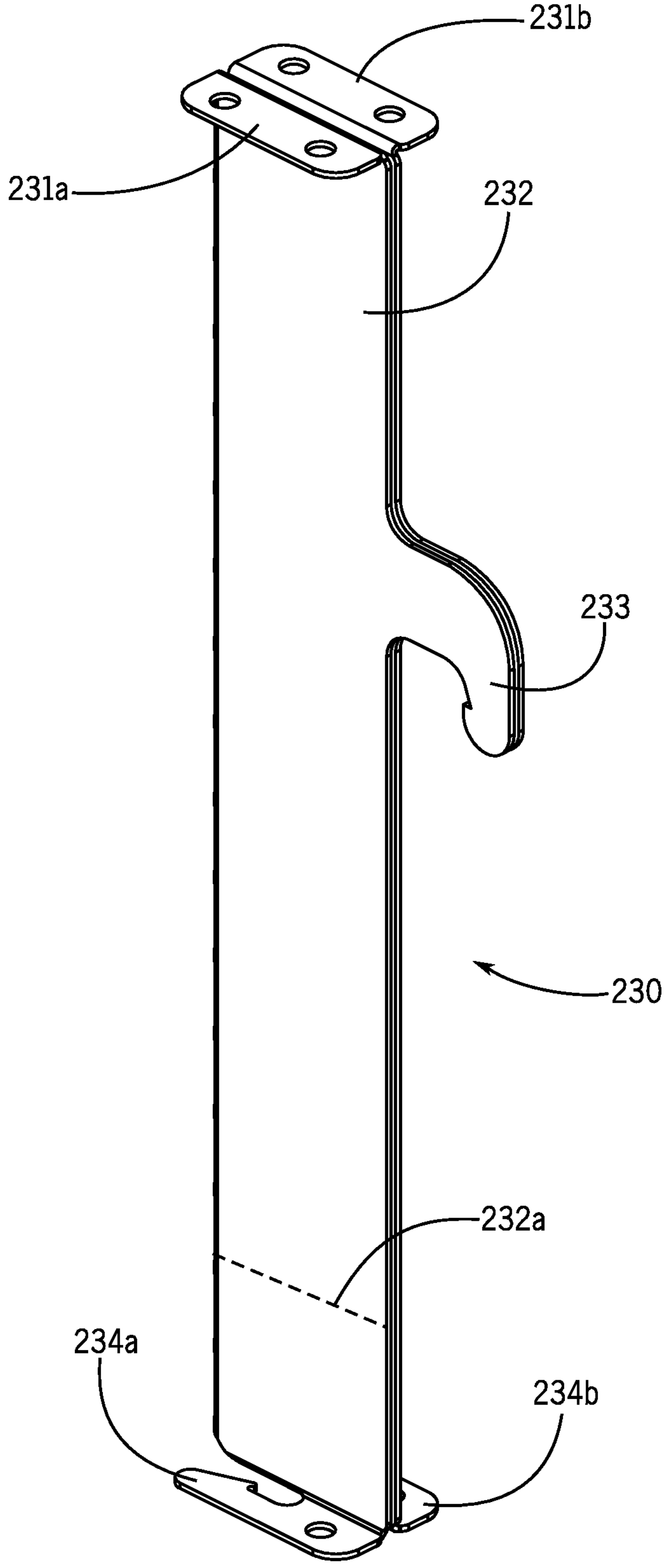
FIG. 57 is a perspective view of the baffle attachment bracket of FIG. 56.
Figure 58:
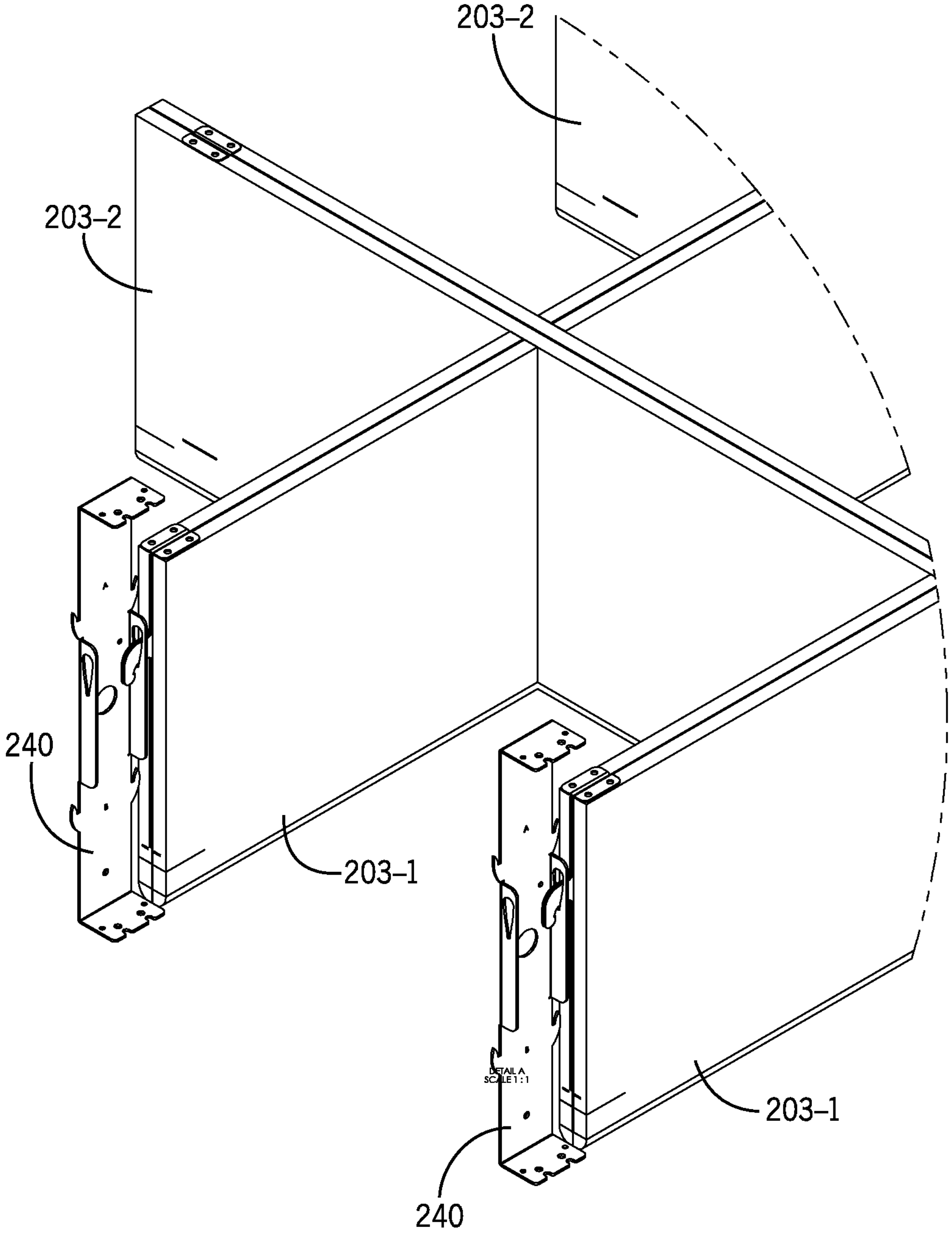
FIG. 58 is a perspective view of a plurality of unlit acoustic panels joined to the lighted fixture of FIG. 55, via a plurality of baffle attachment brackets.

In the example illustrated in FIGS. 56 and 58, acoustic panels 203 each comprise of a single sheet of acoustic material folded in two with an internal brace 230 positioned between acoustic panel portions 203*a* and 203*b*. As shown in FIG. 57 internal brace 230 includes upper flanges 231*a* and 231*b*, and lower flanges 234*a* and 234*b* and a vertical support member 232 configured to be inserted between two plies of acoustic material. As shown, bracket hook 233 is configured to extend from acoustic panel 203. Flanges 231*a* and 231*b* are configured to overlap and secure the upper edges of each of acoustic panel portions 203*a* and 203*b* by screws (not shown). Adhesive, such as double-sided tape, may also be applied along the length vertical support member 230 to further secure acoustic panel portions 202*a* and 202*b* to one another. In the example illustrated in FIGS. 56 and 58, internal brace 230 omits lower flanges 234*a* and 234*b* as represented by bracket end line 232*a*, to accommodate the fold between panel portions 203*a* and 203*b*. In other fixture configurations, internal brace may include lower flanges 234*a* and 234*b*, where, for example, there is no fold.

FIGS. 56 and 58 further illustrate the joinder of acoustic panels 203 to fixtures 10 so as to form the fixture 205 of FIGS. 54 and 55. For purposes of clarity, acoustic side panels 40 and 41, upper support structure 121 and lower support structure 130 of lighted fixtures 10, are omitted from FIGS. 56 and 58. In the embodiment of fixture 205, internal panel braces 190-197 (as shown in FIGS. 41-45) are each replaced by braces such as internal panel brace 240. Each internal panel brace 240 includes upper flange 241 and lower flange 249, each of which is secured to upper support structure 121 and lower support structure 130, respectively, by, for example screws or rivets, and each has vertical member 242 extending there between. Each internal panel brace 240 includes a series of aligned upward facing tabs, such as tab 243, formed perpendicular to the body of each brace 240 and each having a pointed tip 244, which engage with slots pre-formed in acoustic panels 40 and 41, as shown in FIGS. 32A-D. Each internal brace 240 further includes at least one panel flange 247, formed perpendicular to the body of each panel brace 240 and each having at least one opening 248 for receiving bracket hook 233 extending from an acoustic panel 203. It will be appreciated that acoustic panels may be secured to opposing sides of fixture 10 such that bracket hook 233 of internal panel brace 240 associated with such other acoustic panels may likewise engage with panel flange 245 and specifically opening 246. FIG. 58 illustrates the arrangement of acoustic panels 203 in a grid pattern wherein acoustic panels 202-2 and acoustic panels 203-1 are each apertured and notched where they intersect one another to permit a perpendicular or other aligned orientation of same.

The present invention provides both a lighting and sound management solution while eliminating the need for expensive construction, lamination, painting or other treatment of a lighting fixture, relying instead upon the modular acoustic panels for providing aesthetics together with structural rigidity and integrity. Acoustic panels can be easily replaced with panels of a different color, texture, size or density as changes in a room design require.

Although certain example embodiments of an apparatus have been described herein, the scope of coverage of this patent is not limited thereto. On the contrary, this patent covers all methods, apparatuses, and articles of manufacture fairly falling within the scope of the appended claims either literally or under the doctrine of equivalents, as are presented in any non-provisional patent application filed hereon.

We claim:

1. A modular sound absorbing fixture comprising:

at least one linear support structure;

a plurality of acoustic panels, each of said plurality of acoustic panels having at least one cut-out formed therewithin configured to at least partially receive at least a portion of the at least one support structure via insertion of said portion into said at least one cut-out, whereby said plurality of acoustic panels engage said at least one support structure and are supported by said at least one support structure.

2. The modular sound absorbing fixture according to claim 1, in which the at least one cut-out comprises at least one rectangular notch.

3. The modular sound absorbing fixture according to claim 1, in which the at least one cut-out comprises one or more slots pre-formed in the plurality of acoustic panels.

4. The modular sound absorbing fixture according to claim 1, in which the at least one cut-out comprises at least one dovetail-shaped groove.

5. The modular sound absorbing fixture according to claim 1, in which the at least one cut-out comprises at least one cylindrical-shaped groove.

6. The modular sound absorbing fixture according to claim 1, in which the at least one cut-out comprises a threaded region that is configured to cooperate with the threaded region of a screw.

7. The modular sound absorbing fixture according to claim 1, in which at least one of said at least one support structure includes an LED light board.

8. The modular sound absorbing fixture according to claim 7, in which the plurality of acoustic panels are suspended from said at least one support structure.

9. The modular sound absorbing fixture according to claim 7, in which the plurality of acoustic panels are substantially rectangular.

10. The modular sound absorbing fixture according to claim 7, in which the plurality of acoustic panels are chevron-shaped.

11. The modular sound absorbing fixture according to claim 7, in which the plurality of acoustic panels have a curved profile.

12. The modular sound absorbing fixture according to claim 7, in which at least two of the plurality of acoustic panels have different vertical lengths.

13. The modular sound absorbing fixture according to claim 12, in which the at least two of the plurality of acoustic panels having different vertical lengths that collectively form an undulating profile.

14. The modular sound absorbing fixture according to claim 7, in which the at least one linear support structure is configured to be attachable to at least one second linear support structure to form a generally star-shaped support structure, and wherein the plurality of acoustic panels are generally star-shaped.

15. A modular sound absorbing fixture comprising:

at least one linear support structure;

at least one internal support bracket attached to the at least one linear support structure; and a plurality of acoustic panels configured to telescopically engage the at least one internal support bracket.

16. The modular sound absorbing fixture according to claim 15, in which at least one support bracket is attached to the at least one linear support structure in a substantially vertical orientation.

17. The modular sound absorbing fixture according to claim 15, in which at least one of said plurality of acoustic panels is fabricated as a two-ply assembly and the support bracket is positioned therebetween the two plies.

18. A modular acoustic baffle fixture comprising:

an upper linear support structure and a lower linear support structure spaced apart from the upper linear support structure to create a spatial void therebetween;

at least one internal panel brace extending between the upper linear support structure and the lower linear support structure, at least one first fastener element positioned in said at least said one internal panel brace;

at least one suspension member affixed to the upper linear support structure, said at least one suspension member serving to permit the modular acoustic baffle fixture to be attached to and suspended from an overhead structure; and at least one acoustic panel having an inward facing surface and an outward facing surface and further including a second fastener element positioned on the inward facing surface of the at least one acoustic panel, which second fastener element is configured for alignment with said at least one first fastener element in said at least one internal panel brace;

whereby the at least one first fastener element in said internal panel brace cooperates with said aligned second fastener element to secure the at least one acoustic panel between a first side of both of the upper and lower linear support structures to thereby form at least one side of the modular acoustic baffle fixture, which at least one side is configured to acoustically absorb sound directed to the void between said upper and lower linear support structures.

19. The modular acoustic baffle fixture according to claim 18, further including at least one cable gripper connecting the at least one suspension member to the upper linear support structure, wherein the suspension member is a cable support member.

20. The modular acoustic baffle fixture according to claim 18, in which the at least one suspension member is a strut.

21. The modular acoustic baffle fixture according to claim 18, in which the overhead structure is a grid structure.

22. A modular sound absorbing fixture comprising:

at least one linear support structure;

one or more acoustic panels attachable to the at least one linear support structure;

at least one support bracket configured to attach the one or more acoustic panels to the at least one linear support structure;

wherein the one or more acoustic panels are configured to telescopically engage the at least one linear support structure.

23. The modular sound absorbing fixture according to claim 1, in which at least one light fixture is attached to said at least one support structure.

24. The modular sound absorbing fixture according to claim 22, in which the one or more acoustic panels are substantially rectangular.

25. The modular sound absorbing fixture according to claim 22, wherein the one or more acoustic panels comprise polyethylene terephthalate.

26. A modular sound absorbing fixture comprising:

at least one linear support structure;

a plurality of acoustic panels configured to telescopically engage the at least one linear support structure, whereby the plurality of acoustic panels are suspended from said at least one support structure; and at least one cable gripper connecting at least one suspension member to the at least one linear support structure, wherein the suspension member is a cable support member.

27. The modular sound absorbing fixture according to claim 26, in which at least one acoustic panel is attached to the at least one linear support structure in a substantially vertical orientation.

28. The modular sound absorbing fixture according to claim 26, wherein the plurality of acoustic side panels comprise polyethylene terephthalate.

29. The modular sound absorbing fixture according to claim 26, further comprising at least one support bracket configured to restrainably suspend the plurality of acoustic panels from the at least one linear support structure.

30. The modular sound absorbing fixture according to claim 26, in which at least one of said at least one linear support structure includes at least one LED light fixture.

* * * * *